(12) United States Patent
Tolley et al.

(10) Patent No.: US 12,718,389 B2
(45) Date of Patent: Aug. 25, 2026

(54) IMAGE-BASED DETECTION USING DISTANCE DATA

(71) Applicant: Comcast Cable Communications, LLC, Philadelphia, PA (US)

(72) Inventors: Donald Tolley, Alexandria, VA (US); Hongcheng Wang, Arlington, VA (US); Karen Chung, Lansdale, PA (US); Sara Cuesta Gonzalez, Philadelphia, PA (US); Toufiq Parag, Ashburn, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 372 days.

(21) Appl. No.: 18/132,145

(22) Filed: Apr. 7, 2023

(65) Prior Publication Data

US 2024/0338839 A1 Oct. 10, 2024

(51) Int. Cl.
*G06T 7/579* (2017.01)
*G06T 7/246* (2017.01)
(Continued)

(52) U.S. Cl.
CPC .............. *G06T 7/579* (2017.01); *G06T 7/248* (2017.01); *G06T 7/74* (2017.01); *G06V 20/52* (2022.01); *G06T 2200/24* (2013.01); *G06T 2207/10032* (2013.01); *G06T 2207/20092* (2013.01); *G06T 2207/30184* (2013.01); *G06T 2207/30232* (2013.01); *G08B 13/19602* (2013.01); *G08B 13/19684* (2013.01)

(58) Field of Classification Search
CPC ....... G06T 2200/24; G06T 2207/30232; G06T 7/248; G06T 7/579; G06T 7/74; G06T 2207/20092; G06T 2207/10032; G06T 2207/30184; G06V 20/52; G08B 13/19602; G08B 13/19684; G08B 25/002
See application file for complete search history.

(56) References Cited

U.S. PATENT DOCUMENTS 11,295,140 B2 4/2022 Wang et al.
11,798,283 B2 * 10/2023 Sengupta ............... G06V 20/52
(Continued)

OTHER PUBLICATIONS

Ranftl, René, et al. "Towards Robust Monocular Depth Estimation: Mixing Datasets for Zero-shot Cross-dataset Transfer," DOI 10.1109/TPAMI.2020.3019967, IEEE Transactions on Pattern Analysis and Machine Intelligence.
(Continued)

*Primary Examiner* — Kenny A Cese
(74) *Attorney, Agent, or Firm* — Banner & Witcoff, Ltd.

(57) ABSTRACT

Systems, apparatuses, and methods are described for detecting motion and/or objects in images using distance data. An image of an area to be monitored may be used to generate a distance map that maps distances between features in the area and a camera that took the image. Different reactions may be performed based on motion and/or objects detected in images from the camera and determined to be within different distance reaction zones relative to the camera. The different distance reaction zones and reactions may be based on customizable reaction rules. The distance reaction zones and/or reaction rules may be suggested based on similarities between the area to be monitored and other monitored areas.

20 Claims, 26 Drawing Sheets

(51) Int. Cl.

| | |
|---|---|
| ***G06T 7/73*** | (2017.01) |
| ***G06V 20/52*** | (2022.01) |
| *G08B 13/196* | (2006.01) |

(56) References Cited

U.S. PATENT DOCUMENTS

| | | | | |
|---|---|---|---|---|
| 2013/0093896 | A1* | 4/2013 | Jeon | G08B 13/19697 348/152 |
| 2018/0091741 | A1* | 3/2018 | Ida | H04N 23/60 |
| 2018/0189557 | A1* | 7/2018 | Tang | G06V 40/10 |
| 2020/0162663 | A1* | 5/2020 | Rakshit | H04N 23/53 |
| 2020/0210684 | A1* | 7/2020 | Stivers | G06V 10/95 |
| 2020/0327315 | A1* | 10/2020 | Mullins | G08B 13/19615 |
| 2021/0185284 | A1* | 6/2021 | Chan | G01S 7/4808 |
| 2022/0058376 | A1* | 2/2022 | Wang | G06F 21/32 |
| 2023/0290080 | A1* | 9/2023 | Daiter | G06T 7/74 |
| 2024/0071191 | A1* | 2/2024 | Mullins | G08B 13/19613 |
| 2024/0303838 | A1* | 9/2024 | Dana | G06T 9/00 |

OTHER PUBLICATIONS

Liu, Dan et al. "Depth Reconstruction from Single Images Using a Convolutional Neural Network and a Condition Random Field Model." Sensors 2018, 18, 1318; doi:10.3390/s18051318 www.mdpi.com/journal/sensors.

* cited by examiner

| Category | Distance | Angle |
|---|---|---|
| Tree | 34 | -20 |
| Tree | 30 | -5 |
| Bush | 7 | -40 |
| Bush | 15 | -7 |
| Bush | 7 | 30 |
| Bush | 10 | 85 |
| Street | 45 | -45 to 45 |
| Street | 45 | -90 to -45 |
| Driveway | 12 | 30 to 90 |
| Walkway | 1 | 0 |

| Category | Distance | Offset |
|---|---|---|
| Tree | 40 | 230 |
| Tree | 35 | -430 |
| Bush | 10 | 690 |
| Bush | 20 | -70 |
| Bush | 10 | 310 |

| Depth zone | Object | Direction | Excluded? | Notify? | Notifications |
| --- | --- | --- | --- | --- | --- |
| Depth zone 2 | Person | Coming | No | Mobile | Banner |
| | | | | | Vibrate |
| | | | | Smart speaker | Chime |

| Depth zone | Object | Direction | Excluded? | Notify? | Notifications |
|---|---|---|---|---|---|
| Depth zone 2 | Person | Coming | No | Mobile | Banner |
| | | | | | Vibrate |
| | | | | Smart speaker | Chime |

IMAGE-BASED DETECTION USING DISTANCE DATA

BACKGROUND

A monitoring system may use a camera to detect objects and/or motion and/or events that may be relevant to a premises and/or a user of the premises. However, determining responses to objects and/or motion detected in images from the camera may be difficult.

SUMMARY

The following summary presents a simplified summary of certain features. The summary is not an extensive overview and is not intended to identify key or critical elements.

Systems, apparatuses, and methods are described for performing image-based object and/or motion detection using distances from a camera (e.g., a premises-monitoring imaging device). The camera may acquire an image of an area to be monitored for a premises. Distances between the camera and imaged features in the area may be determined and used to generate a distance map corresponding to a field-of-view of the camera. The distances may be determined by applying software-based distance estimation processing to the image, for example, determining distances from objects to the camera or another reference point. The distance map may be used to set up portions or areas of an image to be processed according to the distance or depth of objects in that portion of an image to a reference point, such as the camera. Such portions of an image may be described as distance reaction zones, which represent portions of the monitored area. The zones are associated with defined or determined distances for objects, and corresponding rules for reacting to detected objects and/or motion in the distance reaction zone. Using distance reaction zones and distances of detected objects and/or motion may avoid false alarms and/or excessive notifications by discriminating between objects and/or motion detected in images based on determined distances from the camera. The distance reaction zones may be defined by a user of the premises and/or suggested for the premises based on distance reaction zones for other similar premises. Suggested distance reaction zones with corresponding reaction rules may facilitate setting up monitoring for a premises, making use of distance reaction zones in monitoring the premises more likely, and the benefits thereof more likely to be realized. The different distance reaction zones may correspond to different reaction rules for reacting to objects and/or motion detected within the distance reaction zone. Object and/or motion detection may be performed based on one or more images received from the camera, and detected objects and/or motion determined to belong to a distance reaction zone may be reacted to according to corresponding reaction rules.

These and other features and advantages are described in greater detail below.

BRIEF DESCRIPTION OF THE DRAWINGS

Some features are shown by way of example, and not by limitation, in the accompanying drawings In the drawings, like numerals reference similar elements.

DETAILED DESCRIPTION

Figure 1:
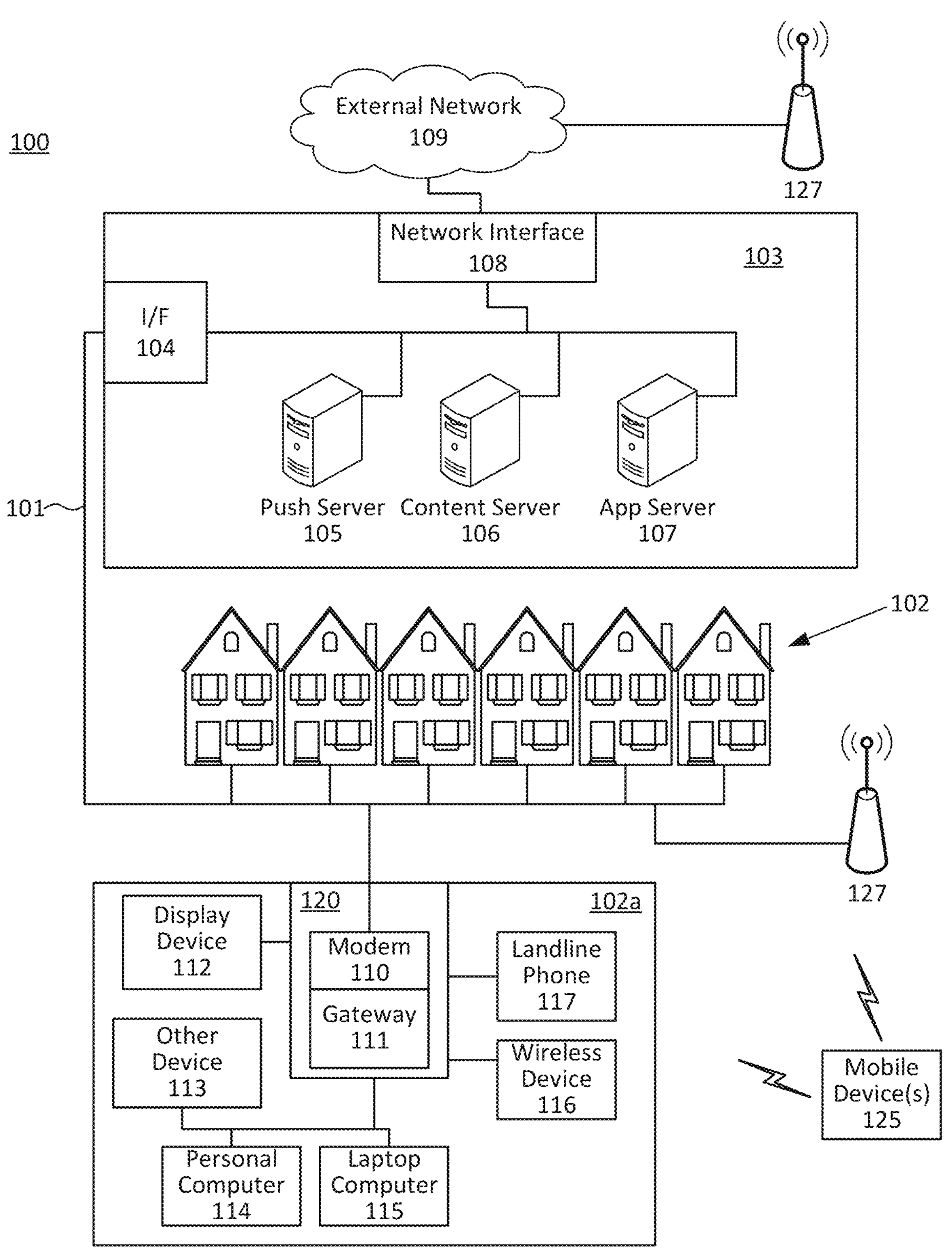
FIG. 1 shows an example communication network.

The accompanying drawings show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. Yet another application server may be responsible for acquiring household and/or user information associated with the premises 102 and/or the mobile devices 125. Yet another application server 107 may be responsible for collecting and/or analyzing security alert and distance reaction zone settings and related information associated with the premises 102 and/or users (e.g., user accounts) associated with the premises 102 and/or the mobile devices 125. The local office 103 may comprise additional servers, additional push, content, and/or application servers, and/or other types of servers. Although shown separately, the push server 105, the content server 106, the application server 107, and/or other server(s) may be combined. The servers 105-107, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
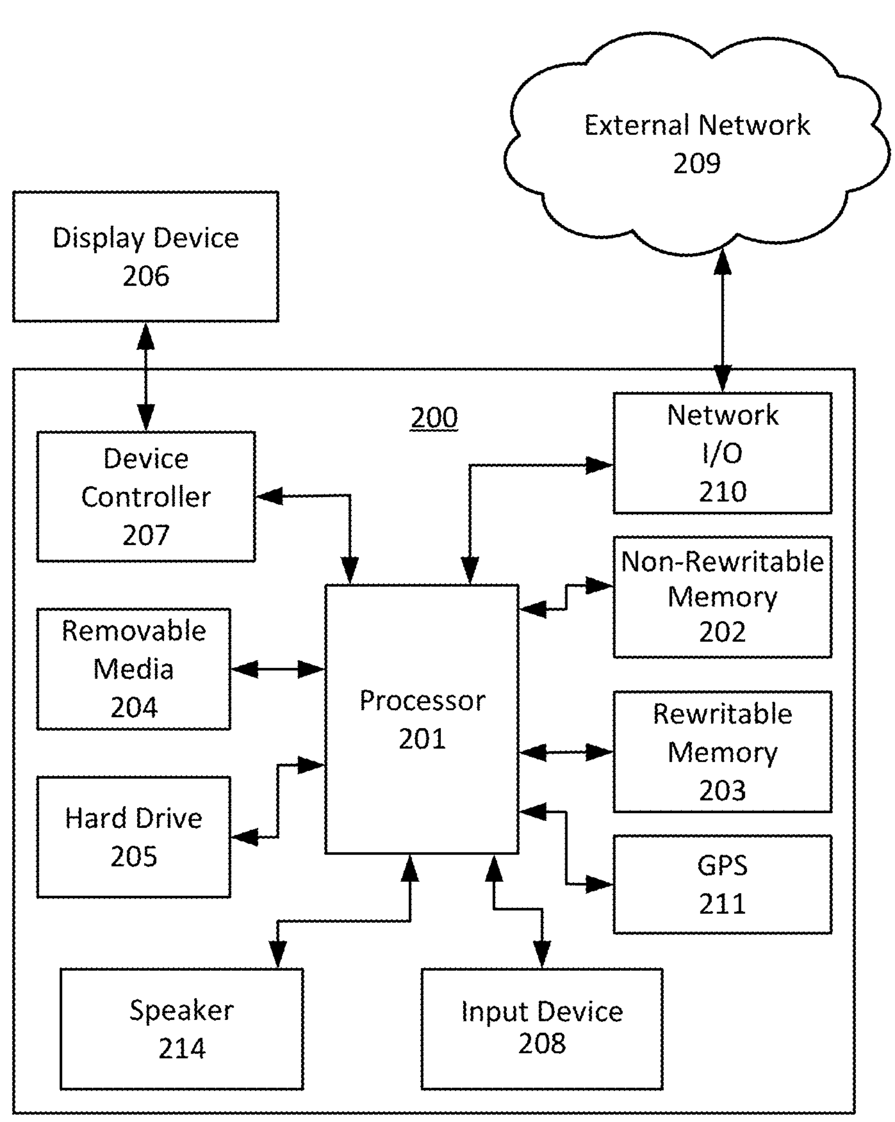
FIG. 2 shows hardware elements of a computing device.
Figure 3A:
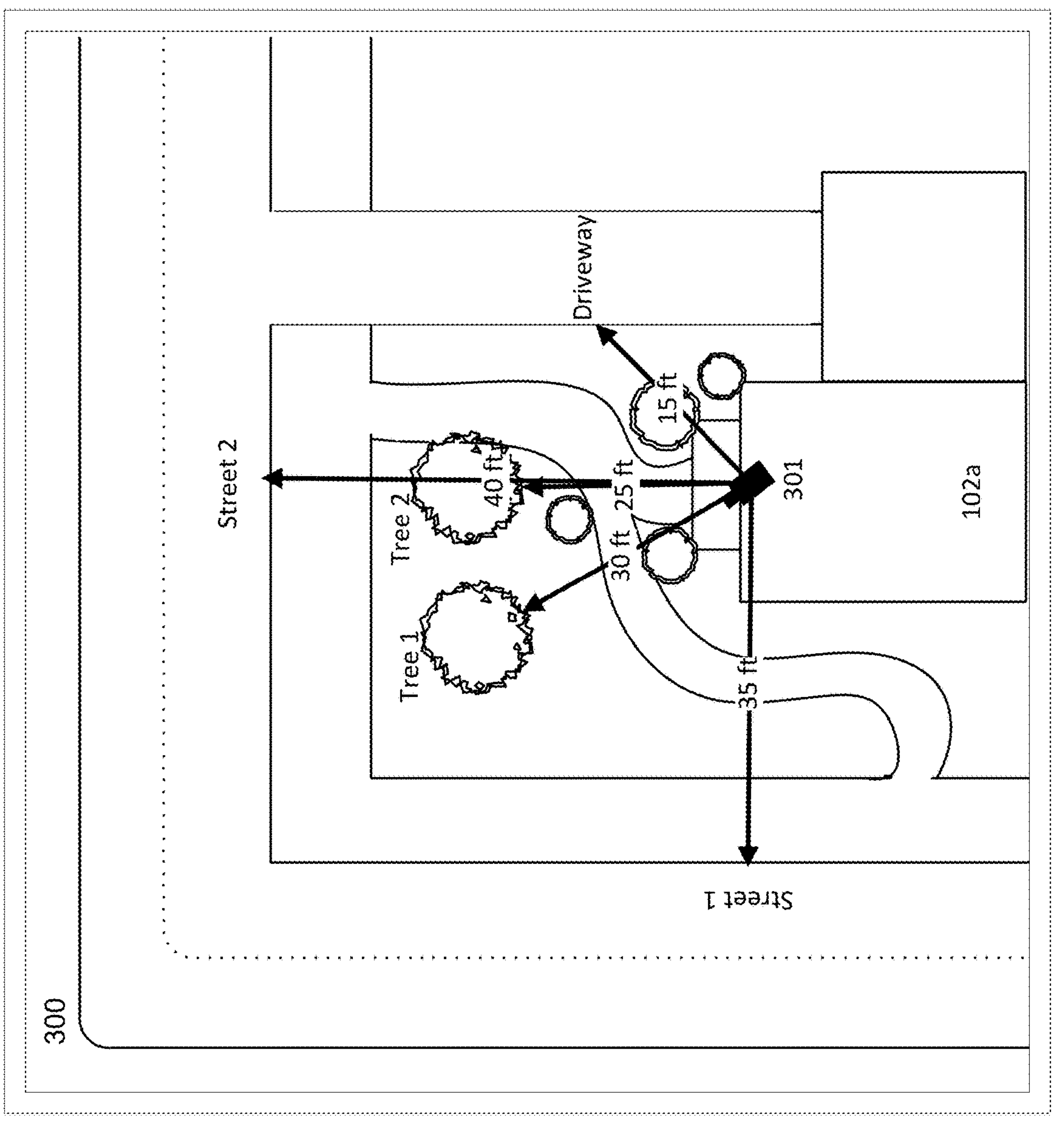
FIG. 3A shows a top-view of an example premises with a camera installed and configured to monitor an area.
Figure 3B:
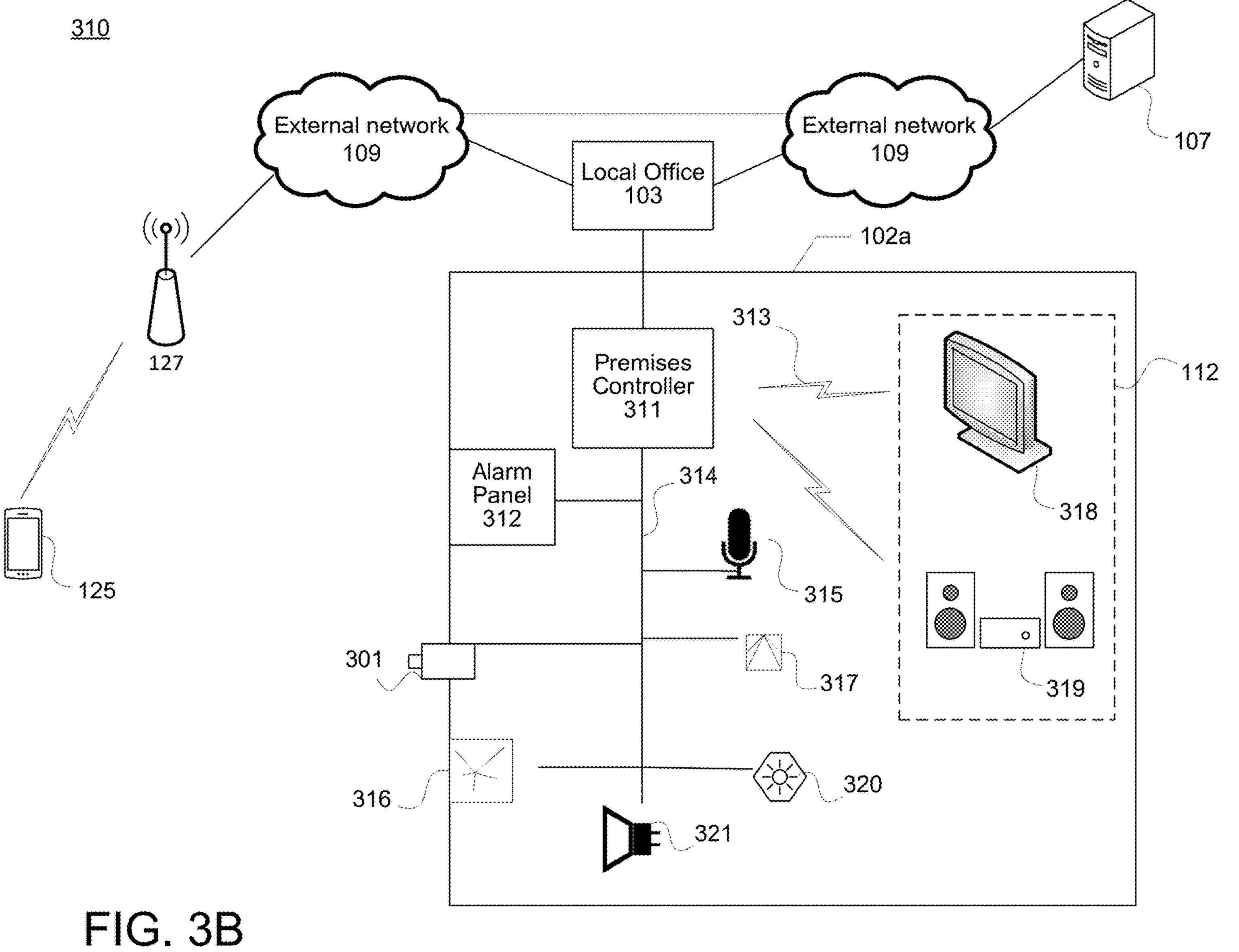
FIG. 3B shows a monitoring system for the premises.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., the camera 301 shown in FIG. 3A, any of the devices shown in the monitoring system 310 of FIG. 3B). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

FIG. 3A shows a top-view of a premises 102*a* with a camera 301 installed at the premises 102*a* and configured to monitor an area 300. The area 300 may comprise an area on, adjacent to, and/or otherwise visible to the camera 301. While a single camera 301 is illustrated in FIG. 3A, there may be a plurality of cameras 301 at various locations around the premises 102*a*. The camera 301 may be configured (e.g., positioned and/or oriented) to capture still and/or moving images of the area 300, and the area 300 may include multiple objects at various physical distances from the camera 301. The distances in FIG. 3A (35 ft to Street 1, 40 ft to street 2, 30 ft to Tree 1, 25 ft to Tree 2, 15 ft to Driveway) indicate physical distances in real space from the physical location of camera 301 (e.g., as may be represented in latitude and longitude or other geographic coordinates) to physical locations of the indicated objects. The camera 301 may be any device capable of imaging (e.g., acquiring an image of at least a portion of) the area 300. The camera 301 may be a video camera capable of taking video to be sent to, and/or streaming video, to a computing device capable of processing the video and/or performing steps of the method, as will be described below. Also, or alternatively, the camera 301 may have its own processing capabilities (e.g., a smart camera), capable of performing some or all of the steps of the methods described below. The camera 301 may be a camera capable of measuring physical distances between objects and the camera 301 (such as a monocular camera, infrared range sensing camera, stereo camera, time-of-flight camera, etc.), and/or the camera 301 may be configured to be used in tandem with one or more devices capable of measuring physical distances to objects.

FIG. 3B shows an example monitoring system 310 of the premises 102*a*. The monitoring system 310 may comprise and/or be connected to the camera 301. The monitoring system 310 may comprise a premises controller 311 capable of controlling one or more devices associated with the premises 102*a* and/or communicating monitoring information with devices inside and/or outside of the premises 102*a* (e.g., with a local office 103, with an application server 107, with a mobile device 125, etc.). The premises controller 311 may be connected to (e.g., comprise and/or configured to receive information from and/or send information to, via wired 314 and/or wireless 313 protocols) an alarm panel 312. The premises controller 311 may be connected to various sensing devices for monitoring the premises 102*a* (e.g., camera 301, listening device 315, glass break sensor 316, motion sensor 317, etc.). The premises controller 311 may also be connected to various output devices of the premises 102*a*, such as light 320, speaker 321 and/or display device 112, which may comprise a display 318 (e.g., TV, monitor, etc.) and/or an audio output device 319 (e.g., speaker, stereo, etc.).

The alarm panel 312 may control monitoring and/or security settings for the monitoring system 310. The alarm panel 312 may receive and/or learn monitoring and/or security settings for the monitoring system. Monitoring and/or security settings may be received as input from a user and/or may be preprogrammed or suggested. For example, a user may set and/or change an arming mode of the monitoring system 310 via the alarm panel 312 in order to enable or disable certain security features. In some examples, arming modes may include an "away" mode, a "night" mode, and/or a "stay" mode, among others. The premises controller 311 may check the modes set at the alarm panel 312 in order to determine a mode of the premises controller 311. If a mode indicates a user is at home, the premises controller 311 may monitor the premises 102*a* to detect patterns of normal activity and behavior, and/or an identity and location of the user. When a mode indicates a user is away, the premises controller 311 may, e.g., increase a level of monitoring at the premise 102*a*.

FIGS. 4-6 show various example screen shots to accompany the flow chart in FIGS. 7A-C, and will now be described in the context of the flow chart. FIGS. 4-6 show example screen shots output by a mobile device 125, but are representative of output by any of the other computing devices discussed above (e.g., any of the devices shown in the premises 102*a* in FIG. 1 and/or FIG. 3B, any of the devices shown in the local office 103 in FIG. 1, any other device in communication with the wireless access points 127, any devices in and/or connected to the external network 109). For example, the screenshots may be representative of output by one or more devices at the premises 102*a* and/or otherwise accessible to a user associated with the premises 102*a*, such that the corresponding method steps may be implemented using direct input of a user of the premises 102*a*, where appropriate. Also, or alternatively, the screenshots may be representative of output by one or more devices. In the following, FIGS. 4-6 will be discussed in terms of output by the mobile device 125, unless specified otherwise, for case of discussion.

Figure 6A:
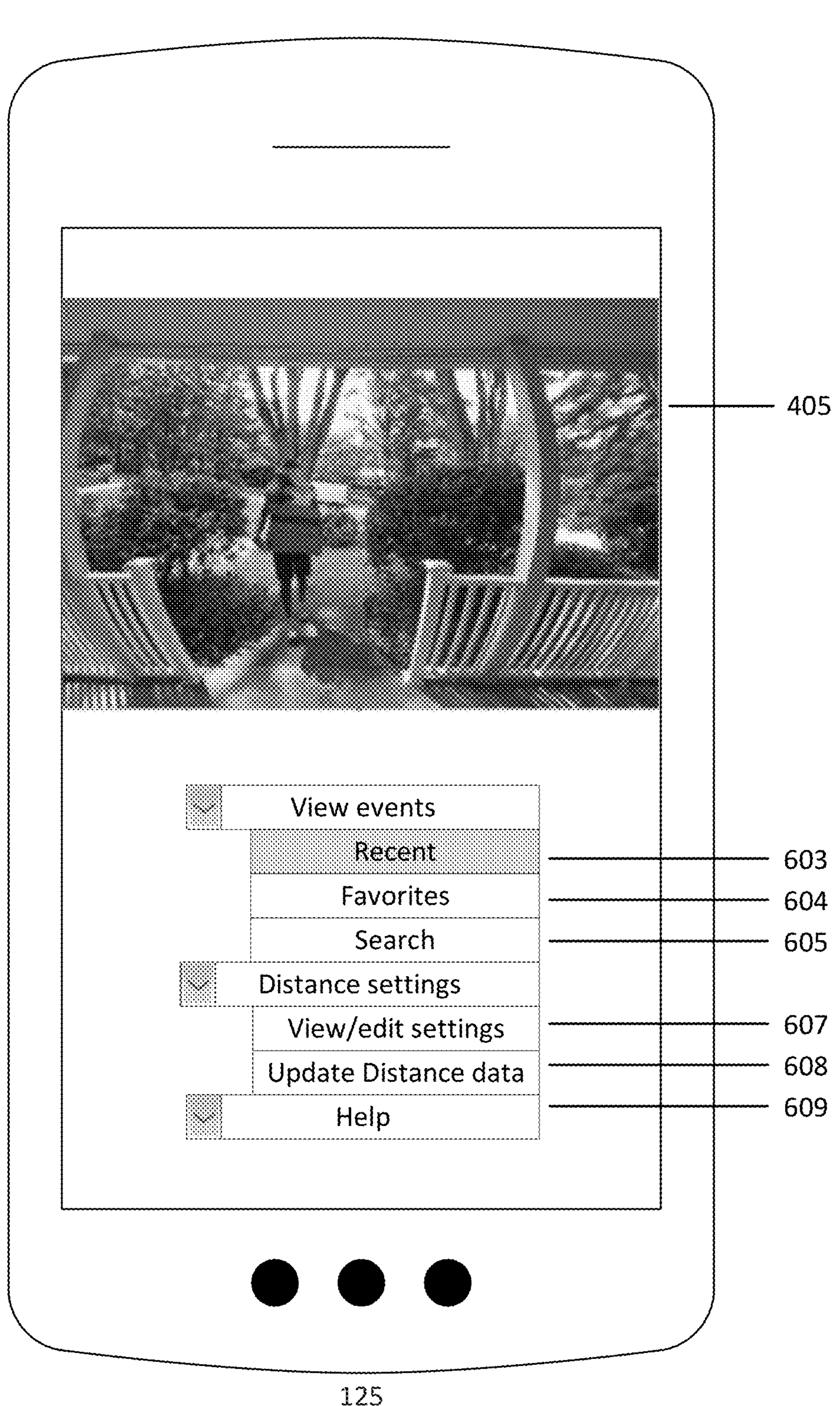
FIG. 6A shows an example screenshot that of a computing device performing steps of the method corresponding to FIG. 7C.
Figure 6B:
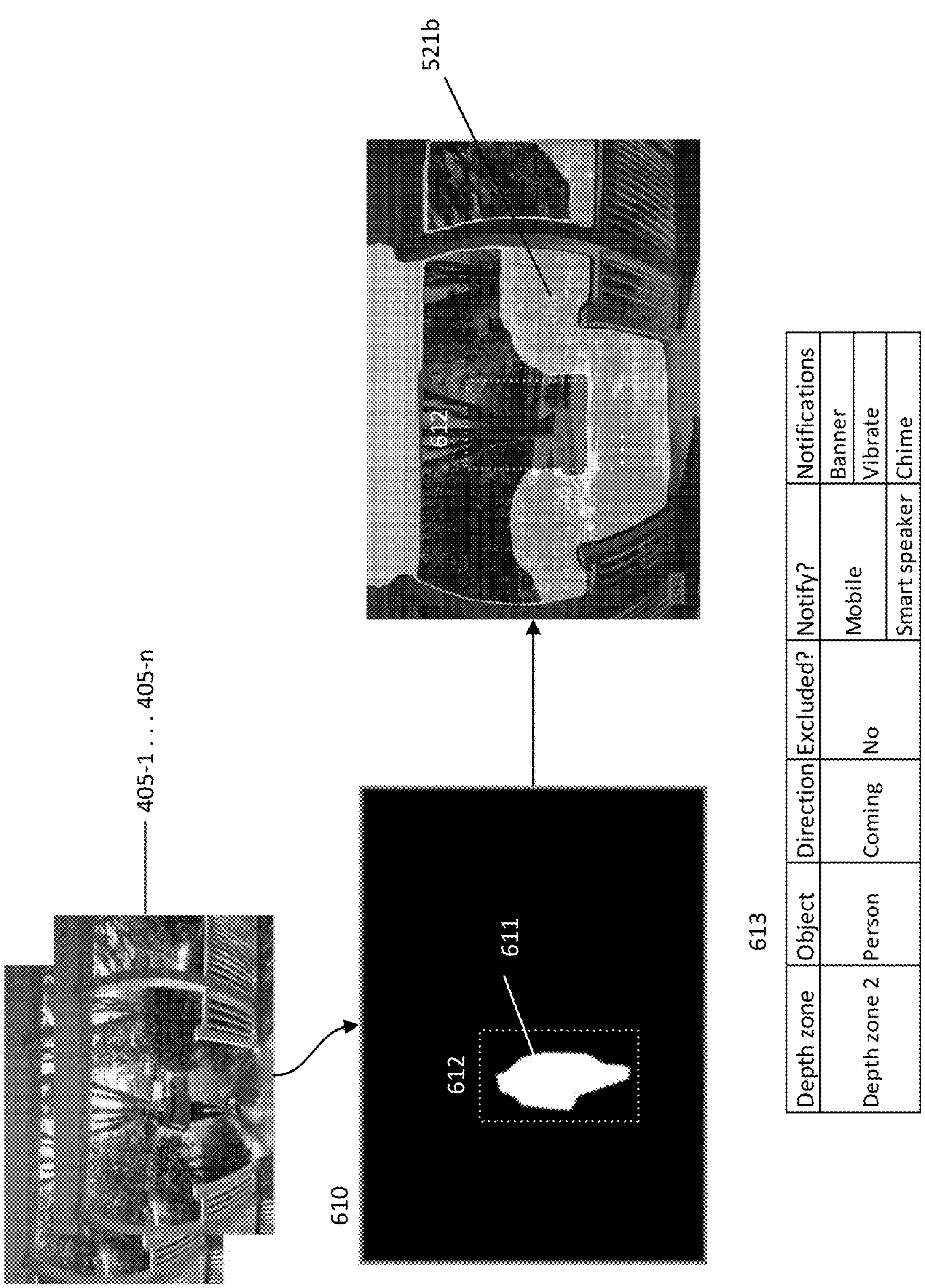
FIGS. 6B-6C shows examples of data used in steps of the method for image-based detection using distance data in FIG. 7C
Figure 6C:
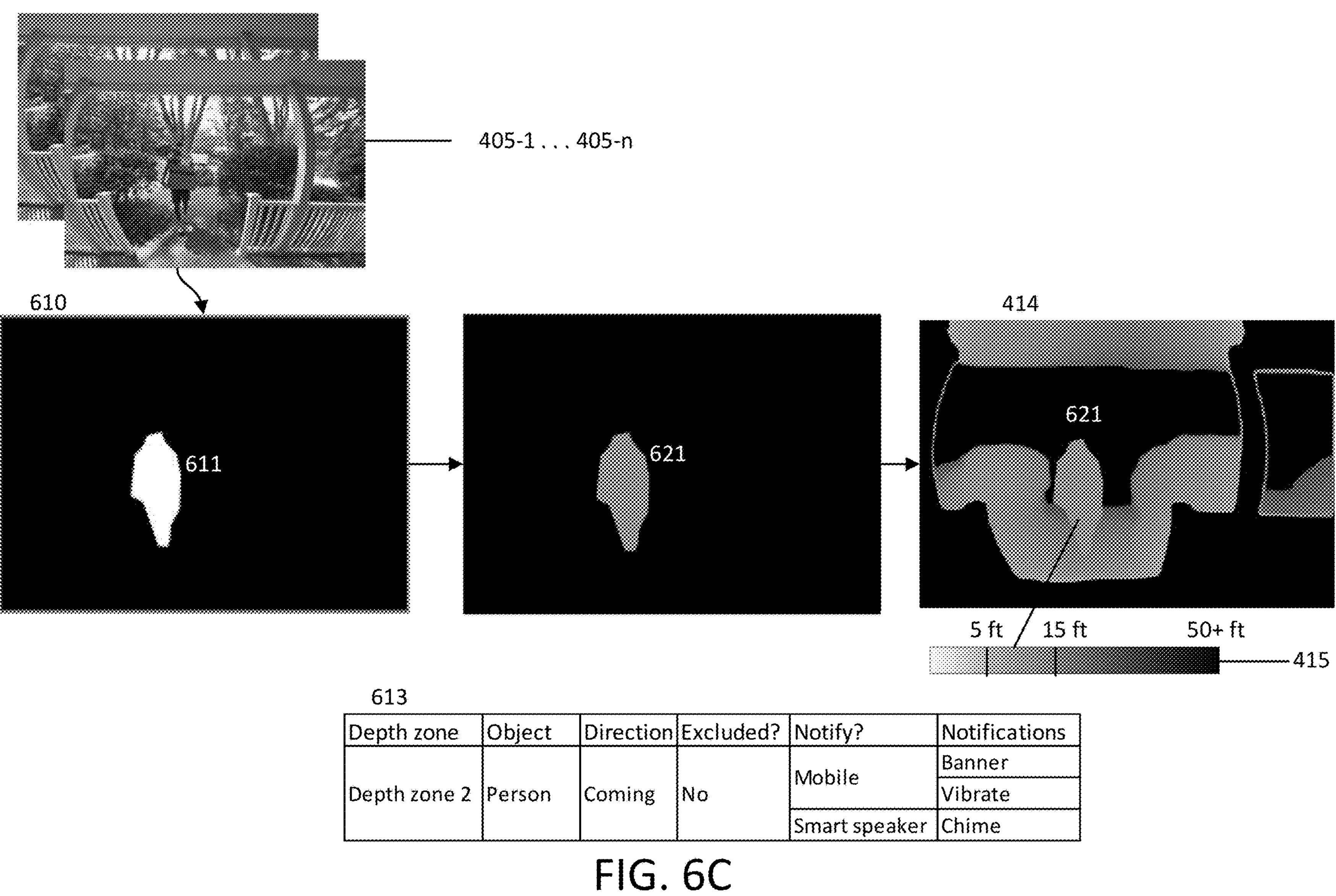
Figure 6D:
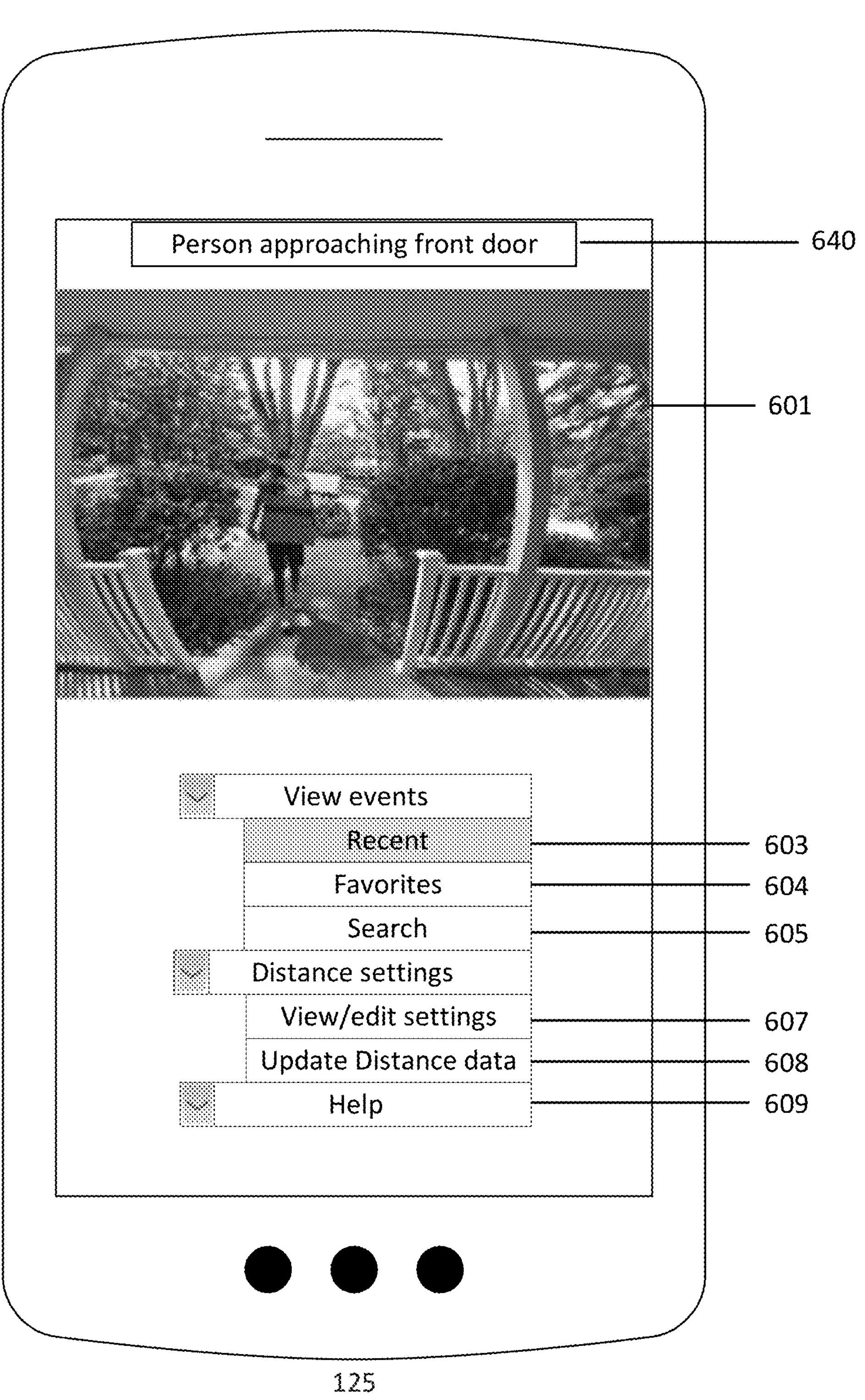
FIG. 6D shows an example screenshot that of a computing device performing steps of the method corresponding to FIG. 7C.
Figure 7A:
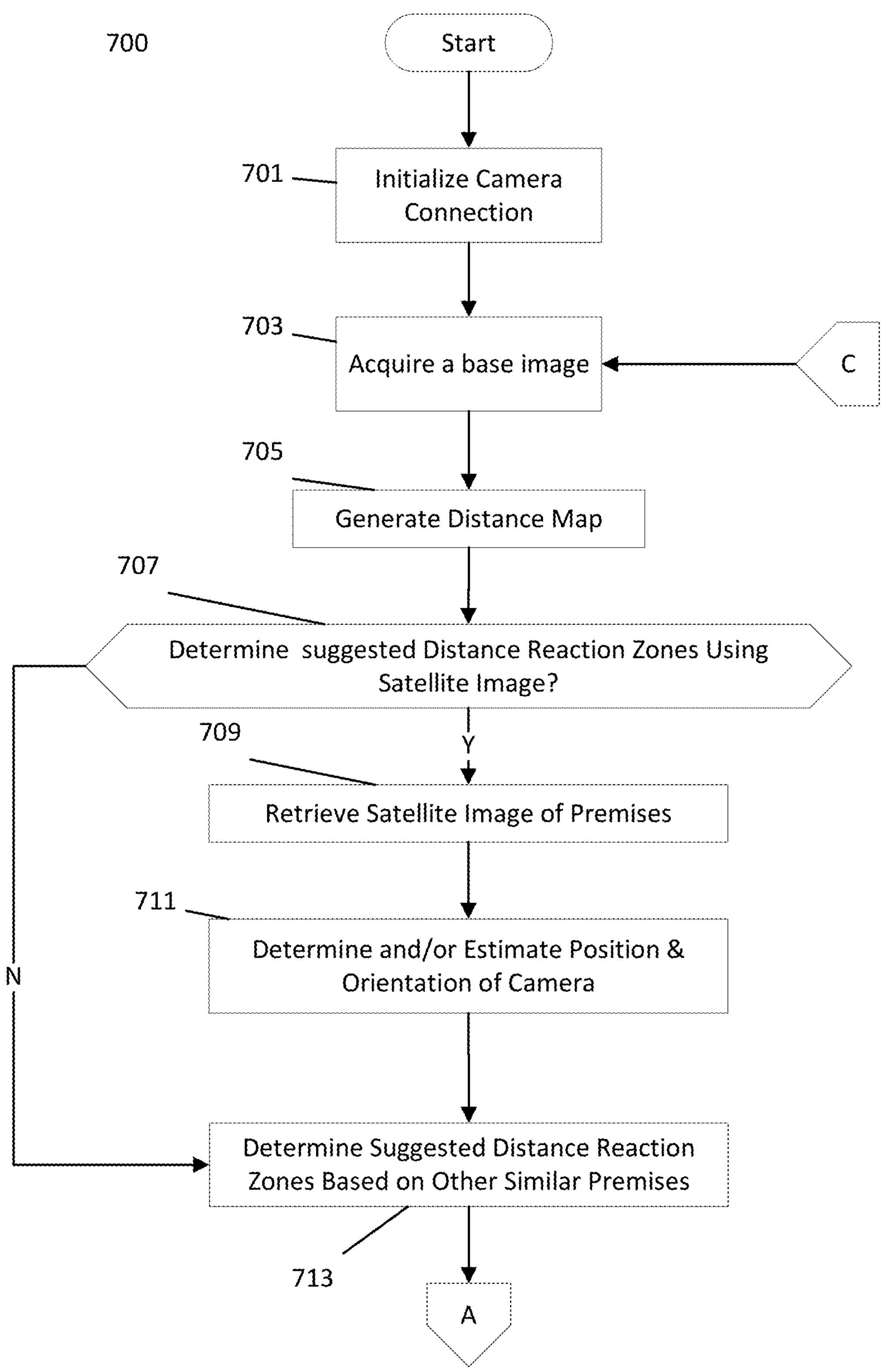
FIGS. 7A-C collectively show a flow chart of a method for using distance data in image-based object and/or motion detection.
Figure 7B:
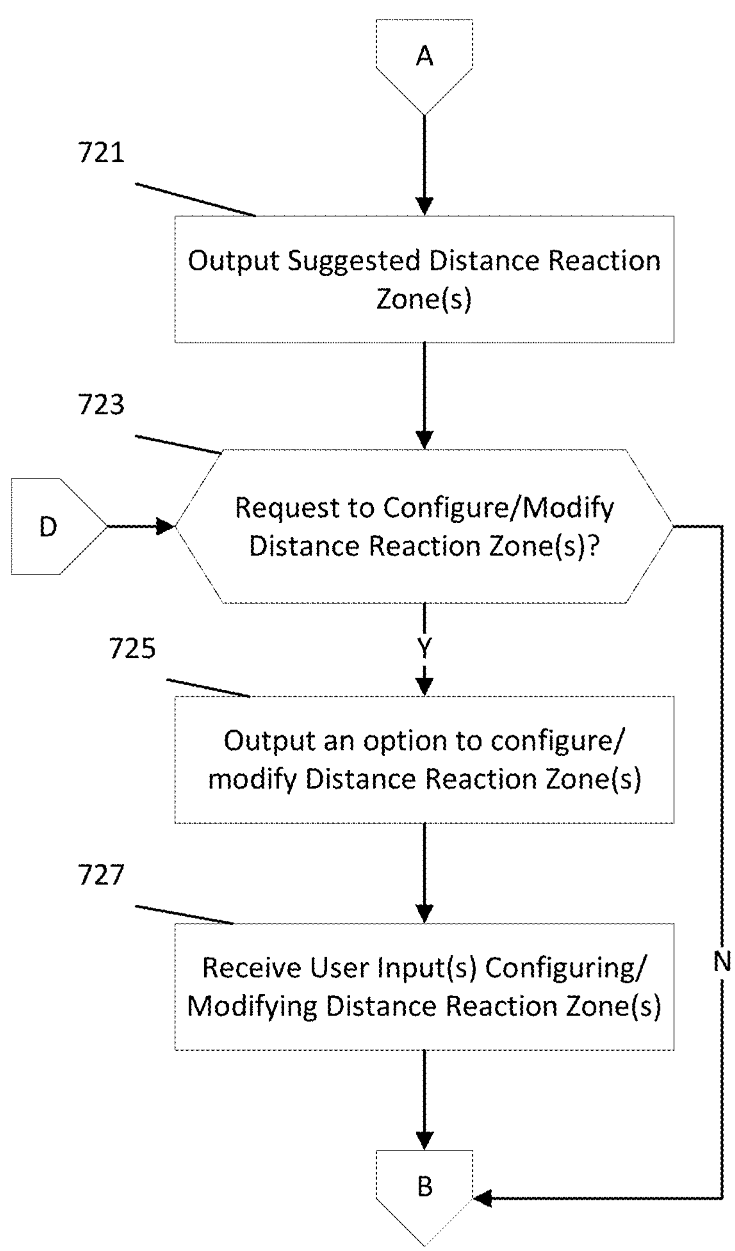
Figure 7C:
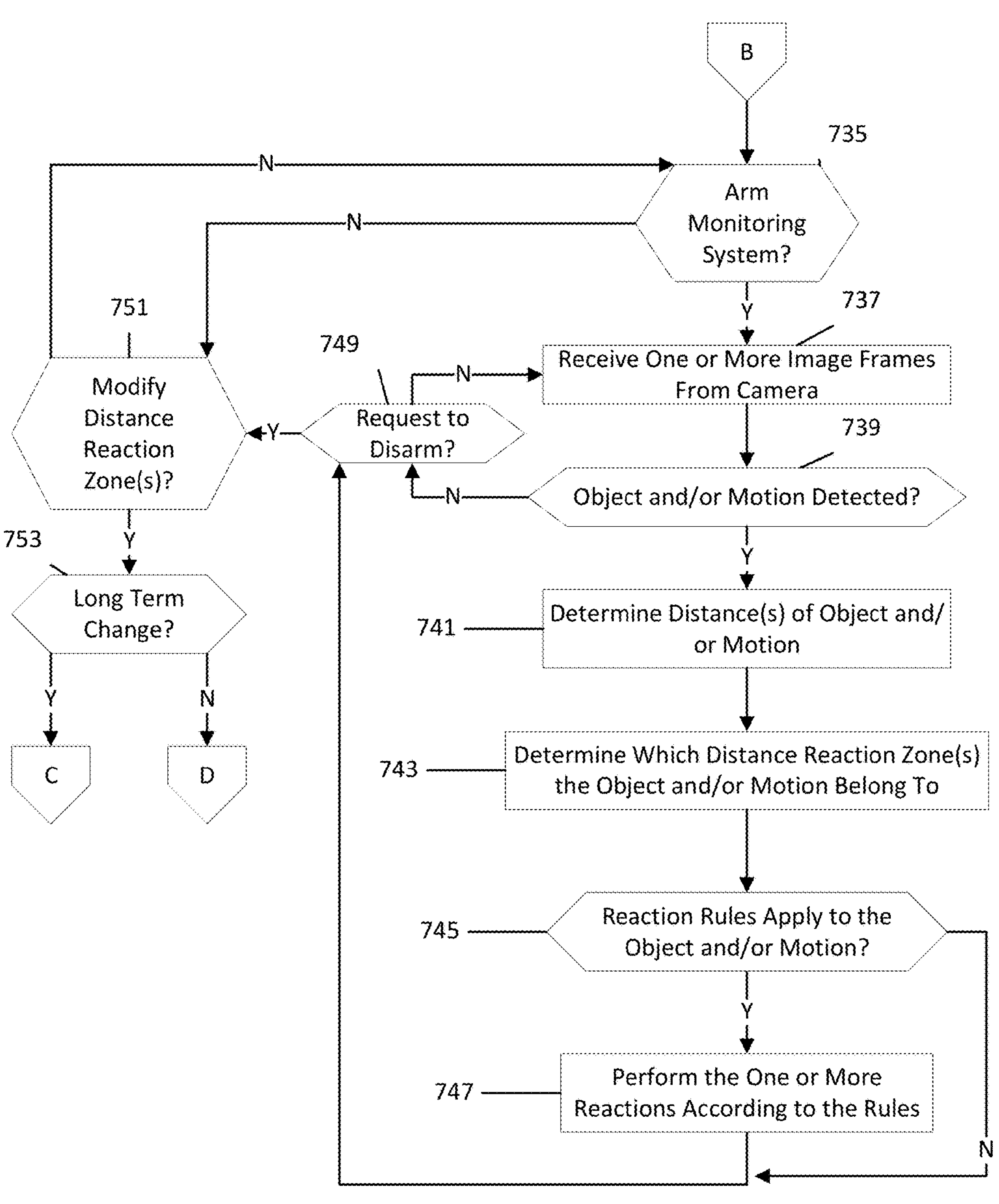

FIGS. 7A-C collectively show a flow diagram of a method 700 for performing in image-based detection using distance data. FIG. 7A shows steps of the method that largely correspond to example output of the method shown in FIGS. 4A-K. FIG. 7B shows steps of the method that largely correspond to example output of the method shown in FIGS. 5A-K. FIG. 7C shows steps of the method that largely correspond to example output of the method shown in FIGS. 6A-D.

In the method 700, image-based detection may comprise detecting motion and/or objects in image data (e.g., image-based motion detection, image-based event detection (such as delivery detection), image-based motion classification, image-based object detection, image-based object recognition, image-based object classification, image segmentation, etc.). Further, because different portions of the area 300 monitored by the camera 301 (e.g., an area corresponding to a field-of-view of a security camera and/or of a doorbell camera) may have different monitoring and/or security needs and/or implications (e.g., according to preferences of a user of a premises 102*a* associated with the area 300, according to crime and/or safety statistics and/or trends, etc.), distance data between the camera 301 and features and/or objects in the images may be determined, and that distance data may be used to distinguish between the different portions of the area 300 so as to distinctly monitor the different portions of the area 300 (e.g., according to the monitoring and/or security needs and/or implication). For example, motion and/or objects (e.g., people, vehicles, packages, etc.) near and/or approaching a premises (e.g., the premises 102*a*) may be of more interest to a user of the premises (e.g., the user may have a greater interest in being notified thereof) and/or have greater security implications (e.g., the detected motion and/or object may be more likely to pose a threat) than motion and/or objects far from the premises and/or moving away from and/or largely parallel to the premises (e.g., people walking by on a sidewalk, a vehicle driving down a street, etc.). Image-based detection may be used to detect motion and/or objects in two-dimensional images of the area 300 (e.g., a detected delivery person approaching a porch, as in FIG. 6B), and distance data of the detected person and/or the portion of the area 300 that the delivery person is determined to be in may be used to determine and cause an appropriate reaction to the detected person.

The distance data corresponding to the camera images may be used to define distance reaction zones in the area 300, wherein the distance reaction zones may each have corresponding reaction rules. For example, the distance data may comprise a distance map corresponding regions (e.g., pixels or groups of pixels) of the camera images to distances or depths between objects in the regions of the camera images to a reference point, such as the camera. The distance map may be used to set up portions or areas of an image to be processed (e.g., processed to detect objects and/or motion) according to the distance or depth of objects in that portion of an image to the reference point. Such portions of an image may be described as distance reaction zones, which represent portions of the monitored area. The distance zones may be associated with defined or determined distances for objects, and rules for responding or reacting to events determined by processing the corresponding portions of the image. Determining which distance reaction zone(s) image-based detection events occurred in and causing reactions according to corresponding reaction rules may allow for precise and/or detailed monitoring of the area 300, which may reduce false alarms and/or excessive/unwanted alerts, notifications and/or other responses to detection events. Avoiding false alarms and/or excessive alert and notifications a user is not interested in may avoid wasted resources (e.g., unnecessary deployment of emergency services) and/or annoyance of a user, increasing a likelihood that a user will configure and/or use the detailed monitoring rules. The method 700 will be described in more detail with reference to the following steps, although it should be understood that one or more of the following steps may be combined, omitted, rearranged, etc. without deviating from the scope of the disclosed method 700.

Figure 4A:
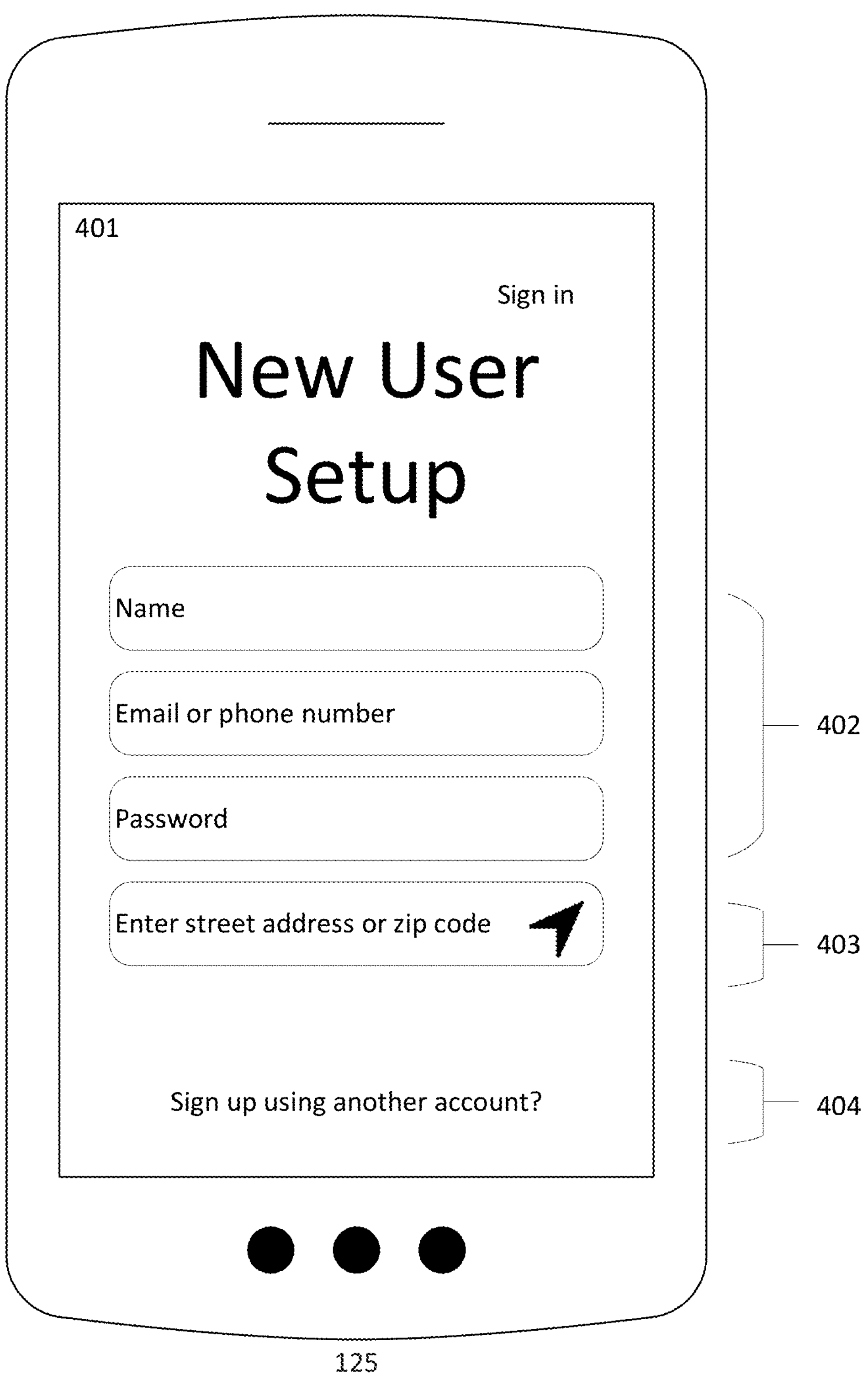
FIGS. 4A-4H show example screenshots corresponding to steps of the method for image-based detection using distance data in FIG. 7A.
Figure 4B:
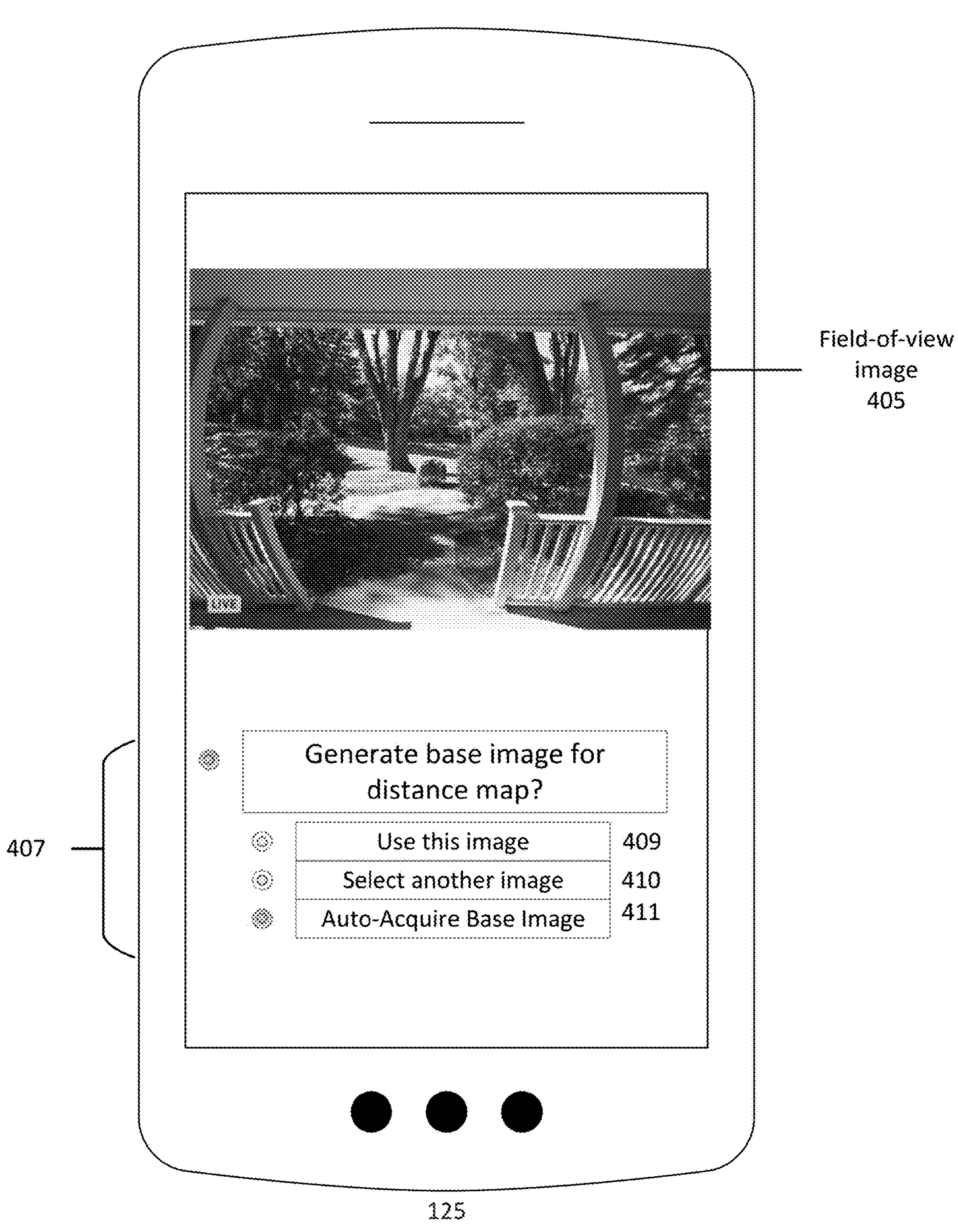

In step 701, the camera 301 may be installed and/or initialized. For example, the camera 301 may be installed at the premises 102*a* and may be initialized to be connected with one or more other devices, such as the mobile device 125, one or more other user devices and/or devices at the premises 102*a*, such as devices of the monitoring system 310, etc. The camera 301, once connected, may receive data from and send data to connected devices. FIG. 4A shows an example in which a connection between the mobile device 125 and the camera 301 may be initialized by allowing a user to set up and/or sign into a user account. An option 401 to set up and/or sign into the user account may be output. The option may comprise an option to create, and/or sign in to, a user account associated with the premises 102*a*, the monitoring system 310, the camera 301, and/or the mobile device 125. An option may be output to allow a user to input user information 402 and/or information about the premises 102*a*, the area 300 and/or the camera 301, such as location information 403. Location information 403 may comprise, for example, an address of the premises 102*a*, coordinates associated with the premises 102*a*, the area 300 and/or the camera 301, and/or information indicating a geographic location of the premises 102*a*, the area 300 and/or the camera 301. Other user information 402 and/or information about the premises 102*a* may be input, such as input information about the user and/or other users (e.g., inhabitants, workers, owners, pets, etc.) of the premises 102*a* (e.g., names, demographics, images, etc.) schedule information associated with users of the premises 102*a* (e.g., typical times away and/or at the premises 102*a*, scheduled vacations, work schedules, sleep times, typical usage of devices at the premises, thermostat and/or security settings of the premises, etc.). Also, or alternatively, the option 401 may allow a user to sign in using another account 404 that may be associated with (e.g. stored with) information about the premises 102*a*, the area 300 and/or the camera 301, such as location information 403 and/or any of the other user information 402, as described above. The user information 402 may comprise and/or be associated with (e.g., correspond to and/or allow access to) information about the camera 301 (e.g., make, model, capabilities, identifying information, such as an IP address, MAC address, serial number, etc.), information about the mobile device 125 (e.g., make, model, capabilities, identifying information, one or more additional users, etc.), information about the premises 102*a* (e.g., household size, quantities and/or identities and/or demographic information of occupants and/or users, a type of the premises as residential and/or commercial and/or public, etc.) and/or about one or more other computing devices associated with the user, and/or information about one or more premises 102 comprising the premises 102*a* (e.g., one or more residential premises, one or more commercial premises, etc. associated with the user). The option 401 may also, or alternatively, comprise an option to select from a plurality of premises 102 associated with the user account for monitoring. Generating and/or signing into the user account may enable the mobile device 125 to communicate with the camera 301 and/or the monitoring system 310 (e.g., via the premises controller 311). User preference information, information about the premises 102*a*, information about settings for the camera 301, the monitoring system 310, user devices and/or other devices associated with the user or the premises 102*a*, data associated with monitoring events (e.g., sensor or alarm trip events, collected images, notifications and/or commands sent, received, and/or responded to, etc.), etc., may be collected and stored using the user account (e.g., in an entry of a database for the user account, tagged with information associated with the user account, etc.). For example, settings and data for performing image-based detection using distance data, as will be described below, may be stored with the user account so as to be quickly and/or easily retrieved, accessed, and/or applied based on a sign-on to the user account.

In step 703, if the camera 301 is initialized and configured to acquire images 405 to be used in performing image-based detection using distance data, a base image 405*b* may be acquired by the camera 301 and/or generated from one or more images 405 acquired by the camera 301. The base image 405*b* may be used in steps to be described subsequently, such as in generating distance data for a distance map. The base image 405*b* may therefore beneficially be acquired, selected and/or generated to satisfy base image criteria that may improve accuracy of distance data determined using the base image 405*b*. The criteria may depend on the particular details of how the distance data is generated, as will be discussed with respect to step 705, for example, but may generally comprise criteria for a base image 405*b* that avoids images of substantial motion and/or temporary objects and/or comprises focused and/or well-lit images of features in the area 300. The criteria may, for example, comprise lighting criteria (e.g., a luminance and/or chrominance of at least a threshold value, a luminance and/or chrominance distribution having certain characteristics (e.g., a threshold variance), a direction of illumination substantially behind the camera 301, etc.), weather conditions at a time of image acquisition (e.g., so as to avoid excessive motion, such as wind below a threshold speed, precipitation below a threshold amount, and/or other weather conditions that correlate to good visibility, lower chance of motion, etc.), a time of day of image acquisition, an amount and/or type of motion indicated by the image (e.g., motion below a threshold amount, motion that is random in direction over a time frame and/or over a distance). As shown in the example screenshot shown in FIG. 4B, an image 405 from the camera 301 may be output with an option 407 to select and/or automatically acquire a base image 405*b*. The option 407 may comprise an option 409 to allow a user to select the presently output image 405, an option 410 to allow the user to select another image. Options 409 and/or 410 may be output with an indication of the base image criteria, so that a user may select and/or approve of an image 405 for use as a base image 405*b*. Also, or alternatively, the option 407 may comprise an option 411 to have a base image 405*b* automatically acquired, selected and/or generated (e.g., to satisfy the base image criteria), and/or the base image 405*b* may be automatically acquired, selected and/or generated by default (e.g., as part of and/or in response to camera initialization).

A base image 405*b* may be automatically acquired by the camera 301 and/or selected from one or more images 405 acquired by the camera 301 based on the acquired and/or selected base image 405*b* satisfying the criteria. For example, the base image 405*b* may be selected from one or more images 405 by the camera 301 (e.g., before storing and/or sending the selected base image 405*b*), and/or by the mobile device 125 from one or more other images 405. One or more images 405 acquired by the camera 301 may be compared to the one or more criteria, and a base image 405*b* may be selected from the one or more images 405 based on the comparison indicating that the selected base image 405*b* satisfies the one or more criteria and/or better satisfies the one or more criteria relative to another (e.g., all others) of the one or more images 405.

Also, or alternatively, multiple images 405 may be combined to generate the base image 405*b*. Combining multiple images 405 to generate the base image 405*b* may reduce a time needed to acquire and/or select a base image 405*b* that meets the base image criteria (e.g., as discussed above). The multiple images 405 may be combined by averaging (e.g., averaging values of corresponding pixels in the multiple images 405), which may average out and/or reduce the appearance of any motion or temporary objects (e.g., a person, a vehicle, an animal, a package, a trash can, a shadow, etc.) in a resulting combined image (e.g., reduce appearances of motion and/or temporary objects relative to any of the individual images 405). Also, or alternatively, the multiple images 405 may be combined by mosaicking to generate a composite image that includes portions of different images 405 of the multiple images 405. The portions of the different images 405 may be selected for use in generating the composite image by determining that the portions of the different images satisfy the one or more criteria. The selected portions of the different images 405 may be combined by tiling and/or stitching, for example, to generate a mosaic image. A mosaic may be helpful for acquiring images of different portions of the area 300 that satisfy criteria for an appropriate base image 405*b* (e.g., substantially stationary, well-lit, avoiding temporary objects, etc.) without the entire area 300 having to satisfy these criteria at one time. Mosaicking may also avoid artifacts of other methods of combining, such as averaging (e.g., blurring, image ghosts, etc.). The combined image may be selected and/or used as the base image 405*b*. The base image 405*b* may be generated by removing motion portions from multiple images 405, e.g., by performing statistical analysis of multiple images 405 to extract background (e.g., stationary) features in the images. For example, the base image 405*b* may be generated using a background segmentation methods such as Gaussian Mixture Models (GMMs) to extract the background features as the base image 405*b* by removing motion portions from multiple images 405.

In step 705, a distance map may be generated for the area 300 using on the base image 405*b*. The distance map may comprise information indicating physical distances (e.g., determined based on physical measurement and/or software-based estimation) between the camera 301 and features in the camera's field-of-view (e.g., in the area 300). The information may comprise the physical distances and corresponding to positions in the image (e.g., coordinates corresponding to pixels and/or groups of pixels) in the base image 405*b*.

Figure 4C:
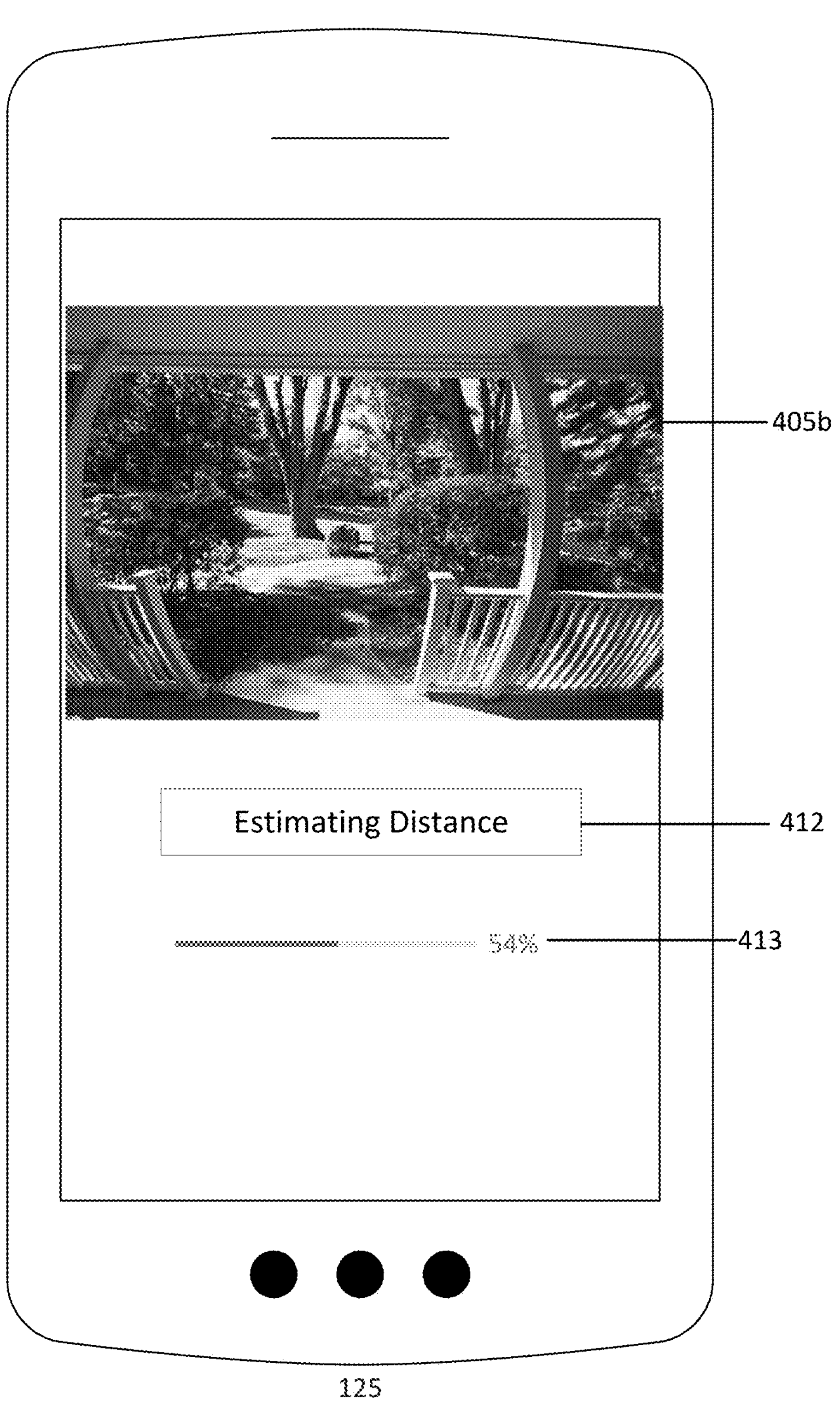
Figure 4D:
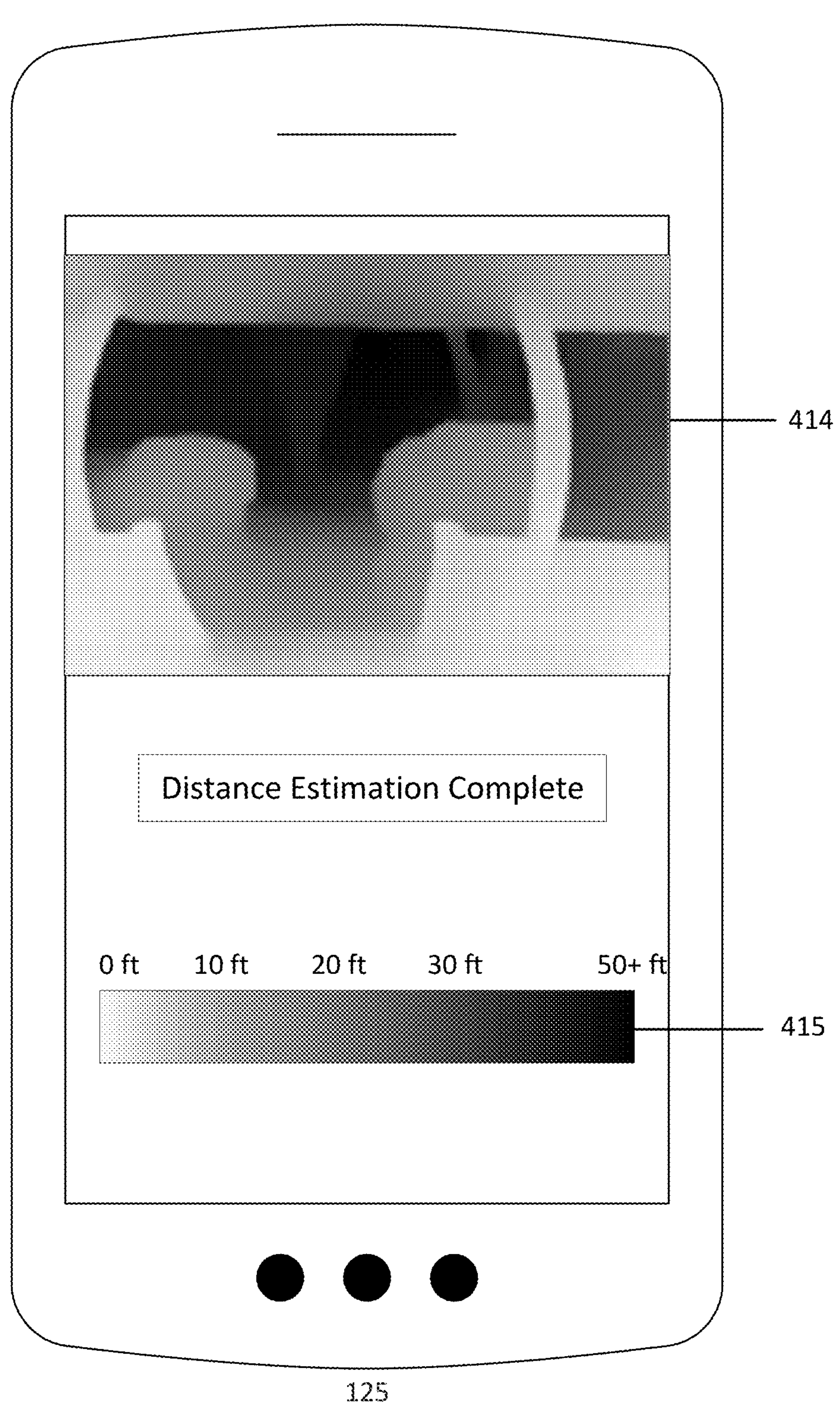

As shown in the exemplary screenshot of FIG. 4C, an indication that the distance map is being generated 412 may be output, as may an indication of progress in generating the distance map 413, for convenience of the user. Also, or alternatively, the base image 405*b* being used to generate the distance map may be output, which may allow the user an opportunity to modify and/or select a different base image 405*b*, if desired. FIG. 4D shows an example screenshot that may be output after the distance map 414 has been generated. The distance map 414 may be output as an graphical representation of estimated distances between the camera 301 and objects and/or regions in the area 300 corresponding to different features and/or regions in the image 405*b* (e.g., different pixels, groups of pixels, etc.). The graphical representation may represent distances according to a visualizable scale (e.g., a grey-scale, a color scale, a texture scale, etc.), such as the grey-scale 415. Distances may be mapped to the visualizable scale (e.g., grey-scale), linearly for simplicity and/or nonlinearly, e.g., for emphasizing and/or improving visibility of a dynamic range of distances and/or distances of interest. FIG. 4D shows the distance map 414 as a representation of distances with corresponding pixels having values of grey-scale 415.

The distance map 414 may be generated by applying a software-based distance estimation to the base image 405*b*. The software-based distance estimation may comprise a distance estimation model (which may be alternately referred to as a depth estimation model). The distance estimation model may be capable of taking an image 405 from the camera 301 as input and using image data (e.g., image features and/or pixel values) in the image 405 to estimate one or more distances between the camera 301 that acquired an image 405 to one or more regions and/or objects that were imaged in the image 405. The distance estimation model may be a monocular distance estimation model (e.g., a model for estimating distances to features in an area based on a single monocular image of the features and/or the area 300). The software-based distance estimation may also, or alternatively, be a learning-based model (e.g., a machine learning and/or a deep learning model). For example, the software-based distance estimation may be a monocular distance estimation model trained on a one or more training data sets (e.g., sets of images with distance annotation of some form, such as one or more ground truth distance reference values). The training data sets may comprise one or more images, generated by cameras associated with the premises 102*a* and/or other premises 102, collected by a centralized server, such as associated with local office 103 and/or application server 107. Also, or alternatively, the training data sets may comprise standardized and/or publicly available and/or privately acquired images. The one or more data sets may comprise data sets characterized by a variety of captured environments and objects (indoor/outdoor scenes, dynamic objects), types of depth annotation (sparse/dense, absolute/relative depth), accuracy (laser, time-of-flight, structure from motion, stereo, human annotation, synthetic data), image quality and camera settings, as well as dataset size. The software-based distance estimation may comprise a monocular distance estimation model trained on a plurality of data sets having a variety of distance annotations that may be incompatible with each other using loss functions that are invariant to major sources of incompatibility between the datasets, such as unknown and inconsistent scale and baseline. One or more publicly available models and/or in-house developed and/or trained models (e.g., trained using images generated by cameras installed at, and monitoring, a plurality of premises 102, which may be aggregated and stored by a central server, such as application server 107, along with associated information, such as image acquisition timing data, camera positions/location, etc.) may also, or alternatively, be used to generate the distance map 414. The distance map 414 may be generated from the image data of the base image 405*b* with or without the use of additional data, such as metadata associated with the base image 405*b* (e.g., EXIF data, location data, etc.), which may provide additional information that may be useful in applying the software-based distance estimation, such as reference distances between points in the area 300, which may serve as ground-truth data and/or scaling data for the distance estimation model. Using the distance estimation model to determine distance data from the base image 405*b* have benefits of avoiding any specialized hardware (e.g., distance measuring hardware), which may reduce cost and processing power for a user by determining distances based only on an image (e.g., a 2-D image) from a camera 301.

Also, or alternatively, range sensing may also, or alternatively, be used in generating some or all of the distance data for the distance map 414. Range sensing may comprise taking a physical measurement that indicates a physical distance to one or more features in the area 300 (e.g., a physical distance between the camera 301 and the one or more features). Range sensing may be performed, for example, using time-of-flight techniques (e.g., light distance and ranging (LiDAR), radar), parallax techniques (e.g., stereo-imaging), structured/coded light (e.g., infrared depth cameras), etc. Range sensing may be performed using range sensing capabilities of the camera 301 (e.g., in a case that the camera 301 is a stereo camera, a time-of-flight camera, etc.). The range sensing may be performed using one or more specialized devices (e.g., hardware and/or software based devices) addition to, and/or integrated with, the camera 301. The range sensing may also be performed using specialized processing (e.g. for acquiring and generating stereo images, for outputting and generating images from structured/coded light, for performing LiDAR, etc.). Range sensing capabilities of the camera 301 and/or the one or more specialized devices associated with the camera 301 may be detected automatically, and range sensing may be used based on the detected capabilities. For example, image data received from the camera 301 may be determined to have a file type indicating range sensing capabilities of the camera 301 (e.g., three-dimensional imaging file types, such as .mpo, .pns, .jps file types) and/or be associated with metadata (e.g., EXIF data) that may be determined to indicate distance data associated with the image and/or distance imaging capabilities of the camera 301 and/or an associated range sensing device. Range sensing may be used in generating the distance map 414 in response to user input. For example, an option to enable/disable range sensing, and/or an option to specify certain conditions in which to use range sensing, may be output (e.g., by the mobile device 125). The certain conditions may comprise conditions that the mobile device 125, and/or another device performing processing related to the range sensing, has sufficient processing power, available network bandwidth and/or battery to receive the range-sensing data and/or perform the required processing without substantially interfering with other operation of the mobile device 125 (e.g., has processing power, available network bandwidth and/or battery over a threshold amount). For example, the option may comprise options to perform range sensing only if the mobile device 125 is connected to WiFi, and/or is connected to a power source (e.g., plugged in), etc. The certain conditions may also, or alternatively, comprise conditions related to imaging and/or environmental conditions. For example, structured light and/or time-of-flight technologies may have limited range and/or operating conditions (e.g., reduced accuracy if the area 300 is illuminated brightly, if there are other structured light and/or time-of-flight technologies operating in the area 300, if the area 300 has features that are specularly reflective, etc.), laser scanning technologies may provide more sparse depth measurements when there is motion in an area being scanned (e.g., if it is windy), etc. Also, or alternatively, range sensing may be used automatically. For example, processing needed for the range sensing may be compared to processing capabilities (e.g., processing power, memory or other storage, etc.) of the mobile device 125 and/or the another device configured to process range sensing data and/or combine it with image data from the camera 301.

If range sensing technology not available, if range sensing is not enabled, if processing power and/or bandwidth for handling range sensing data and/or performing range sensing processing is not available, etc., range sensing will not be used in generating distance data. If range sensing is available, enabled, is sufficient processing power and/or bandwidth are available, distance data may be generated using the range sensing, at least in part. The generated distance data may indicate distances from the camera 301 to one or more features in the area 300. The generated distance data may be for a subarea of the area 300. The subarea may be defined according to capabilities of the range sensing (e.g., a maximum distance of the range sensing, a resolution of the range sensing, etc.). A correspondence may be made between the generated distance data and one or more positions (e.g., pixel positions) corresponding to images of the features in the base image 405*b* of the area 300. The one or more features in the area 300 may be selected to be one or more of the camera image landmark objects 462. The one or more features in the area 300 may also, or alternatively, be features within a range limit of the range sensing technology.

In steps 707-713, suggested distance reaction zones may be determined for the premises 102*a*. As described previously, distance reaction zone for the premises 102*a* comprises information indicating a portion of the area 300 for which corresponding reaction rules apply during monitoring of the area 300. Applying different reaction rules to different distance reaction zones in the area 300 may allow for monitoring the area 300 distinctly according to the distance reaction zones and corresponding reaction rules.

Distance reaction zones may be defined for the area 300 by one or more distance boundaries, which may be determined and/or described based at least in part on one or more distances from the camera 301 (e.g., a near boundary and far boundary). The near and far boundaries may be uniform boundaries (e.g., semicircles from a position of the camera 301) and/or may be different for different regions in the area 300 (e.g., based on an offset from the camera orientation 426 and/or another reference direction). Suggested distance reaction zones may be determined and/or generated for the premises 102*a* based on distance reaction zones of similar premises 102 and/or pre-programmed distance reaction zones (e.g., pre-programmed for certain types of premises 102 having certain attributes). Monitoring the area 300 using distance reaction zones may allow for monitoring different portions of the area 300 according to their different monitoring and/or security implications and/or needs, which may avoid excessive false detection events and/or false alarms and/or excessive/unwanted notifications and alerts. Providing suggested distance reaction zones and/or other suggested monitoring settings for the premises 102*a* may facilitate set-up of the distance reaction zones for a user of the premises 102*a*, which may make the user more likely to configure distance reaction zones for monitoring the premises 102*a* and realize the benefits thereof. Further, providing suggested distance reaction zones based on distance reaction zones and monitoring settings of similar premises 102 may provide a benefit of suggesting distance reaction zones that have been tested and potentially determined to be effective (e.g., at avoiding false detection events and excessive notifications).

In step 707, a determination may be made as to whether or not to use a map-view image of the premises 102*a* and/or the area 300 (e.g., a map-view image comprising the location indicated by location information 403) in generating the suggested distance reaction zones. The map-view image may be used to determine a location, orientation, and/or field-of-view (e.g., the area 300) of the camera 301 with respect to the premises 102*a*. The location, orientation, and/or field-of-view of the camera 301 may in turn be used to determine and/or adapt suggested distance reaction zones for the premises 102*a*, as will be explained below.

The map-view image may comprise any image and/or any data that provides location information for features in the area 300. For example, a satellite image, an aerial image, a street-view image, an image from a second camera and/or a camera associated with another premises 102, a non- and/or any non-image location data (coordinates and/or other location data about streets, property boundary lines, building footprint data, topological data, etc.). The map-view image may comprise and/or be associated with corresponding metadata. Metadata corresponding to a map-view image 427 may comprise data about the source of the image, [e.g., location of the image, time and date of the image, camera information about the image, as may be found in exchangeable image file format (Exif) data], geographic metadata [e.g., latitude, longitude and/or elevation data corresponding to points and/or pixels within the map-view image, scale information, orientation information, information identifying features and/or objects imaged in the map-view image 427 (street names, addresses, location coordinates, titles, property boundaries, etc.), geographic information system data, etc.].

It may be determined to use a map-view image associated with the location information 403 in generating suggested depth reaction zones (707—Y) if use of a map-view image in generating suggested reaction zones is enabled and/or requested. Use of a map-view image may be enabled as a default (e.g., a default setting of a program and/or device performing the determination), which may simplify a user default experience. Also, or alternatively, use of a map-view image in generating a distance map may be disabled as a default, and/or may be enabled based on user input. This may reduce time and data-processing used for default generation of the distance map 414, and may provide a user with increased control and flexibility.

Also, or alternatively, if it is determined that a map-view image is available corresponding to the location information 403, it may be determined to use the available map-view image in generating suggested distance reaction zones (707—Y). The location information 403 may have been received in step 701 (e.g., as input from a user and/or as data associate with a user account) and/or determined and/or received using on localization capabilities (e.g., global positioning system (GPS) receiver) of one or more devices associated with the premises 102*a*, such as the camera 301 and/or one or more devices associated with the monitoring system 310. Also, or alternatively, one or more images 405 from the camera 301 may comprise and/or be associated with metadata indicating the location information 403 of the camera 301 (e.g., a geotag may be included in metadata data associated with an image 405). The location information 403 may be extracted from the metadata.

A data store may comprise one or more sources of data corresponding location information to map-view images, such as a global information system (GIS) database and/or a user data store comprising information corresponding one or more user accounts to one or more premises 102 and/or corresponding location information 403 and/or one or more corresponding map-view images and/or associated metadata. The user data store may comprise and/or be associated with a collection of databases for storing, organizing, and relating information about users, user accounts, associated premises 102 and distance reaction zones, corresponding rules and detection events. The user data store may be maintained by a central server (e.g., application server 107) and/or the local office 103. Data relevant to a user account of the user data store (e.g., a map-view image corresponding to the premises 102*a* associated with the user account, premises metadata corresponding to the premises 102*a* associated with the user account, etc.) may be retrieved (e.g., pulled) from one or more systems of record, and stored in the user data store and/or in an associated database. The data relevant to the user account may be retrieved and/or updated based on generation of the user account and/or periodically and/or in response to a change in information associated with the user account. Retrieving and storing the data in the user data store may make it easier and/or faster to determine availability of a map-view image associated with the premises 102*a* and/or of other premises metadata.

If it is determined that a map-view image corresponding to the location information 403 is available (e.g., a response to a request for a map-view image using the location information 403 returns a corresponding map-view image), it may be determined to use the map-view image in generating suggested distance reaction zones (707—Y). If use of a map-view image in generating suggested distance reaction zones is not enabled, if location information 403 is not received and/or determined, and/or if it is determined that a corresponding map-view image is not available, the map-view image may not be used in generating the suggested depth zones (707—N).

In step 709, based on determining to use a map-view image in generating suggested distance reaction zones (707—Y), a map-view image corresponding to the location information 403 may be retrieved. The map-view image may be requested and/or retrieved, e.g., from the data store and/or the user data store described above.

Figure 4E:
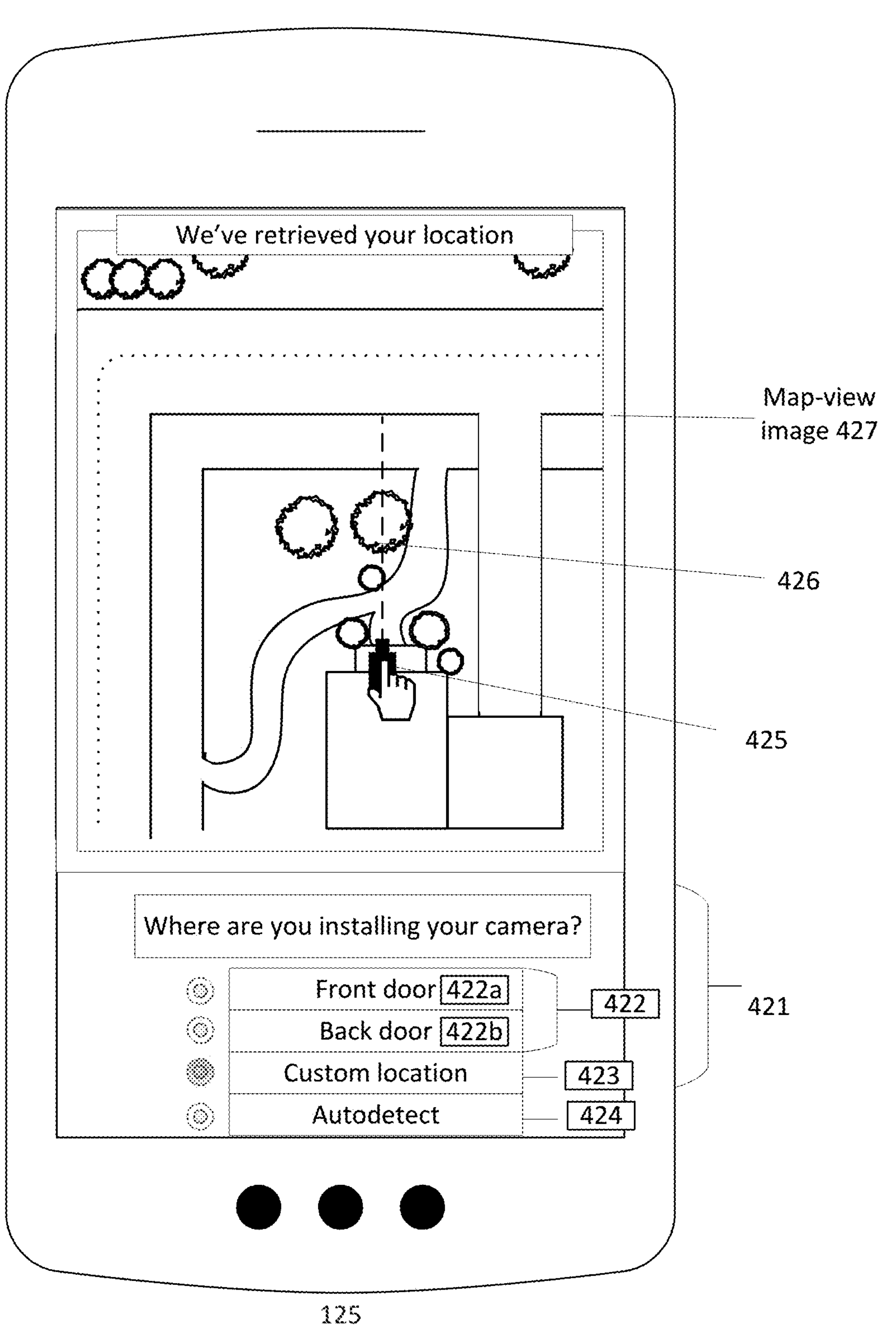

In step 711, the map-view image 427 retrieved in step 709 may be used to determine a position and/or orientation of the camera 301. FIG. 4E shows an example screen shot that may be output indicating that the map-view image 427 has been retrieved (e.g., in step 709). One or more estimation options 421 for generating and/or inputting an estimated position 425 and/or orientation 426 of the camera 301 (e.g., on, and/or relative to, the premises 102*a*) may be output. The one or more estimation options 421 may comprise one or more suggested camera position options 422, which may allow for user selection of one or more suggested camera positions 422*a*, 422*b*, etc., at which the camera 301 is, or will be, located. For example, information about previous camera positions and/or orientations at which a camera was installed at the premises 102*a* may have been stored (e.g., with information about the user account in the user data store) and the suggested camera position options 422 may indicate these previous camera positions. Also, or alternatively, layout information about the premises 102*a* may be retrieved (e.g., a floorplan of the premises 102*a* stored with the user account and/or a real estate database, such as ATTOM) and positions corresponding to one or more entry/exit points (e.g. front door 422*a*, back door 422*b*) or other likely installation positions may be determined. The suggested camera position option 422*a*, 422*b*, etc., may be selectable (e.g., by a user tapping and/or clicking one of the options 422*a*, 422*b*, etc.). Based on the selection, the region of the map-view image 427 that corresponds to the suggested position may be indicated (e.g., highlighted, outlined, etc. in the map-view image 427), to allow for a user to view, confirm and/or adjust the selected suggested camera position option 422.

Also, or alternatively, the one or more estimation options 421 may comprise a custom option 423 to provide a custom estimation of the position 425 and/or orientation 426 of the camera 301. The map-view image 427 may be interactive (e.g., comprise selectable pixels and/or positions) by default and/or if the custom option 423 is selected. The output map-view image 427 may be interactive such that positions and/or pixels in the map-view image 427 are selectable (e.g., by a user tap, click, dragging and dropping an icon, etc.). User input (e.g., a tap, a click, a drag-and-dropped icon, etc.) may be received at the map-view image 427 to indicate the custom estimated position 425 of the camera 301. An icon and/or other indicator of the estimated position 425 may be output at the estimated position 425. The icon and/or other indicator may be rotatable, so a user may be able to rotate the icon and/or other indicator to indicate an estimated orientation 426 of the camera 301.

The one or more estimation options 421 may comprise an autodetect option 424. The autodetect option 424 may be selected and/or enabled as a default and/or if it is determined that the camera 301 has a localization capability (e.g., comprises a GPS receiver). This may be determined, for example, based on information about the camera 301 received during initializing the connection with the camera 301 in step 701, and/or metadata associated with one or more camera images 405 indicating a position 425 of the camera 301 (e.g., coordinates of the camera 301). If the autodetect option 424 is selected and/or enabled, the position 425 and/or orientation 426 of the camera 301 may be determined and/or estimated using the localization capability of the camera 301.

The position 425 and/or orientation 426 of the camera 301 may also, or alternatively, be determined using landmark object matching. In landmark object matching, one or more landmark objects may be identified in an image 405 from the camera (e.g., in base image 405*b*) and one or more landmark objects may be identified in the map-view image 427. Matching may be performed between the one or more landmark objects in the image 405 and the one or more landmark objects in the map-view image 427, and positions of the matched landmark objects in the image 405 and the map-view image 427 may be used to determine a position and/or orientation of the camera 301 relative to the premises 102*a* and/or the area 300. Landmark object matching may be performed if the autodetect option 424 is selected and localization capabilities are not available and/or do not comprise capabilities of determining an orientation. Also, or alternatively, the landmark object matching may be performed in addition to the above position and/or orientation estimation, as user input may be incorrect and/or imprecise and landmark object matching may improve accuracy of the estimated position 425 and/or orientation 426. If an estimated position 425 and/or orientation 426 of the camera 301 has been acquired, the estimated position 425 and/or orientation 426 may be used to determine an estimated field-ofview of the camera and/or to determine one or more regions of the map-view image 427 likely to be at least partially occluded by other objects within a line of site of the camera. Based on the estimated field-of-view and/or the one or more regions, landmark object matching may be performed using a corresponding portion of the map-view image 427 (e.g., within the expected field-of-view, and/or outside of the one or more regions), which may avoid unnecessary image processing (e.g., recognizing objects in irrelevant areas of the map-view image 427).

Figure 4F:
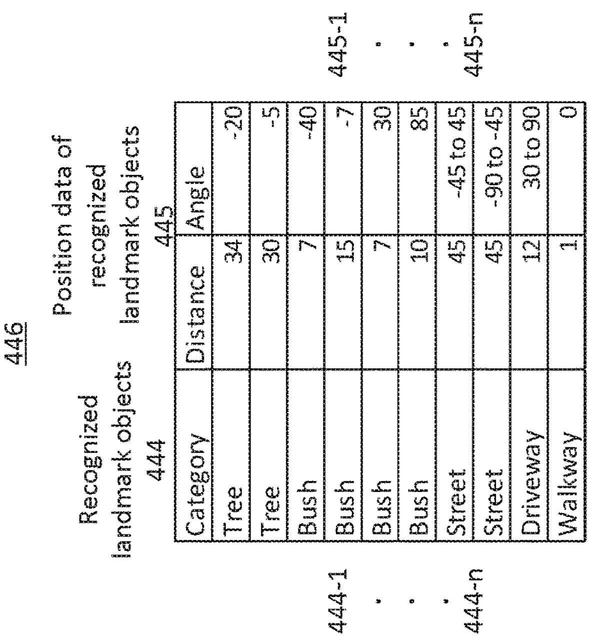
Figure 4F:
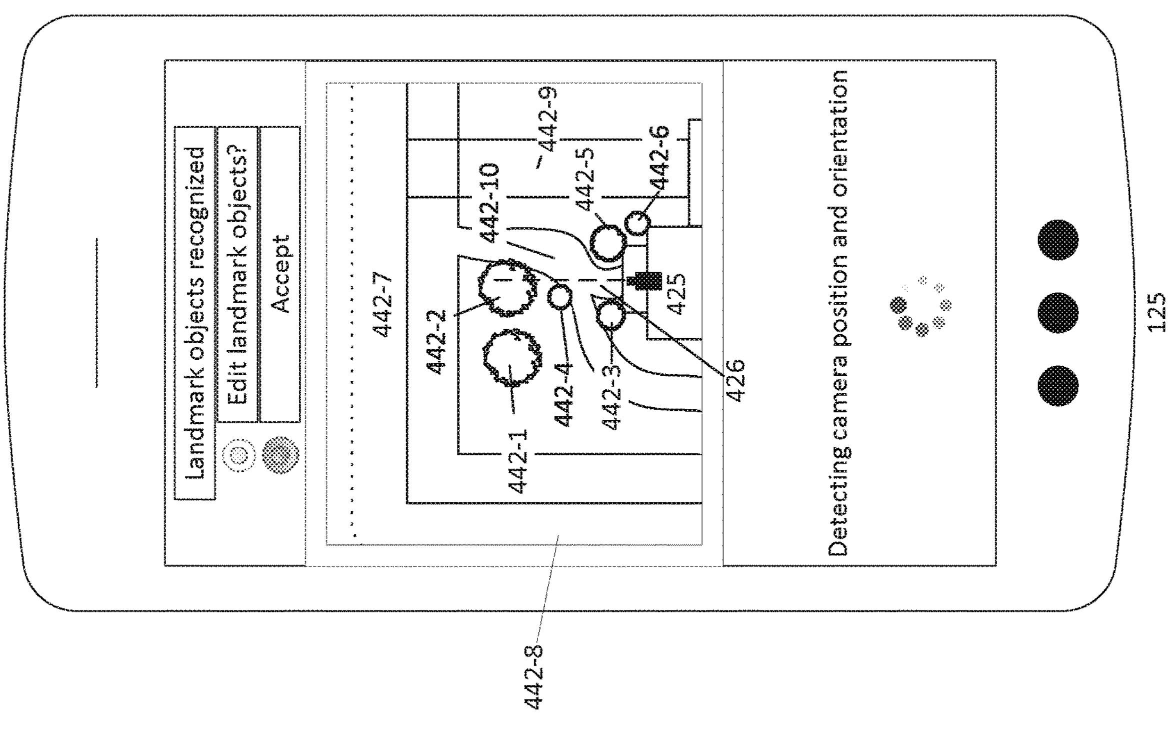

As shown in FIG. 4F, map-view image landmark objects 442 may be recognized and/or categorized using the map-view image 427 and/or any associated metadata. For example, object recognition and categorization may be performed on the map-view image 427 to recognize and/or categorize objects that may fall into one of one or more landmark object categories. The object recognition and/or categorization may be performed using an artificial intelligence or machine learning framework for recognizing objects of the landmark object categories and/or performing semantic segmentation based on the landmark object categories. Landmark object categories may be preprogrammed and/or loaded for performing object recognition on the map-view image 427, and/or provided by user input. The landmark categories may comprise categories of objects that are expected to be static over long time periods (e.g., months, years, etc.). The landmark object categories may include, for instance, streets, sidewalks, porches, lawns, bushes, trees, mailboxes, driveways, alleys, pools, lamp posts, street signs, land features (e.g., hills), walls, doors, windows, hallways (e.g., in a case that the area 300, to be monitored by the camera 301, is at least partially indoors), etc. If no map-view image landmark objects 442 are recognized, suggested distance reaction zones may be determined without using landmark object matching (e.g., the method may proceed to step 713).

The recognized map-view image landmark objects 442 are individually indicated in FIG. 4F as 442-*i* for integer i (e.g., 442-1 to 442-9, or generally 442-1 to 442-*n* for n recognized map-view image landmark objects 442). A confirmation option 441 may be output to allow a user to provide input to accept and/or edit the indicated map-view image landmark objects 442. For example, based on receipt of input indicating a selection to edit the map-view image landmark objects 442, the indicated map-view image landmark objects 442 may become selectable (e.g., by tapping, navigating and/or clicking using a mouse and/or keyboard, etc.). A selection of a map-view image landmark object 442-*i* may cause output of an option to ignore and/or recategorize a recognized map-view image landmark object 442-*i*, which may allow for avoiding matching using a misrecognized and/or miscategorized object and/or a recognized object in the map-view image 427 that is no longer in the area 300. A selection of a map-view image landmark object 442-*i* may also, or alternatively, cause output of an option to use the selected map-view image landmark object 442-*i* in matching landmark objects (e.g., to ignore unselected map-view image landmark objects 442-*i*). The base image 405*b* (or another image 405 from the camera 301) may be output with the map-view image 427 indicating the recognized map-view image landmark objects 442, and the user may be able to tap and/or click regions in the base image 405*b* that correspond to selected map-view image landmark objects 442-*i*.

Category values 444 and/or position information 445 associated with the map-view image landmark objects 442 may be determined. For example, the determined category values and/or position information 445 may be stored in a table, such as table 446, comprising entries for the map-view image landmark objects 442 (e.g., after being accepted and/or edited by a user, and/or as recognized). An entry for a given map-view image landmark object 442-*i* may comprise a corresponding category value 444-*i* and/or position values 445-*i* (e.g., pixel coordinates within the map-view image, geophysical coordinates, and/or physical distance and/or direction from the estimated camera position 425, etc.). Category value 442-*i* may indicate the category the map-view image landmark object 442-*i* was categorized as, and may be used in landmark matching by matching objects of the same category. The position information 445-*i* may indicate positions of the map-view image landmark object 442-*i*. (e.g., a representative position of the map-view image landmark object 442-*i*, such as a center-of-mass of a region of the map-view image landmark object 442-*i*, a point on the map-view image landmark object 442-*i* closest to the estimated position of the camera 301, etc.). The position information 445-*i* may comprise multiple positions of the map-view image landmark object 442-*i*, such as multiple points along a border of the map-view image landmark object 442-*i*.

Figure 4G:
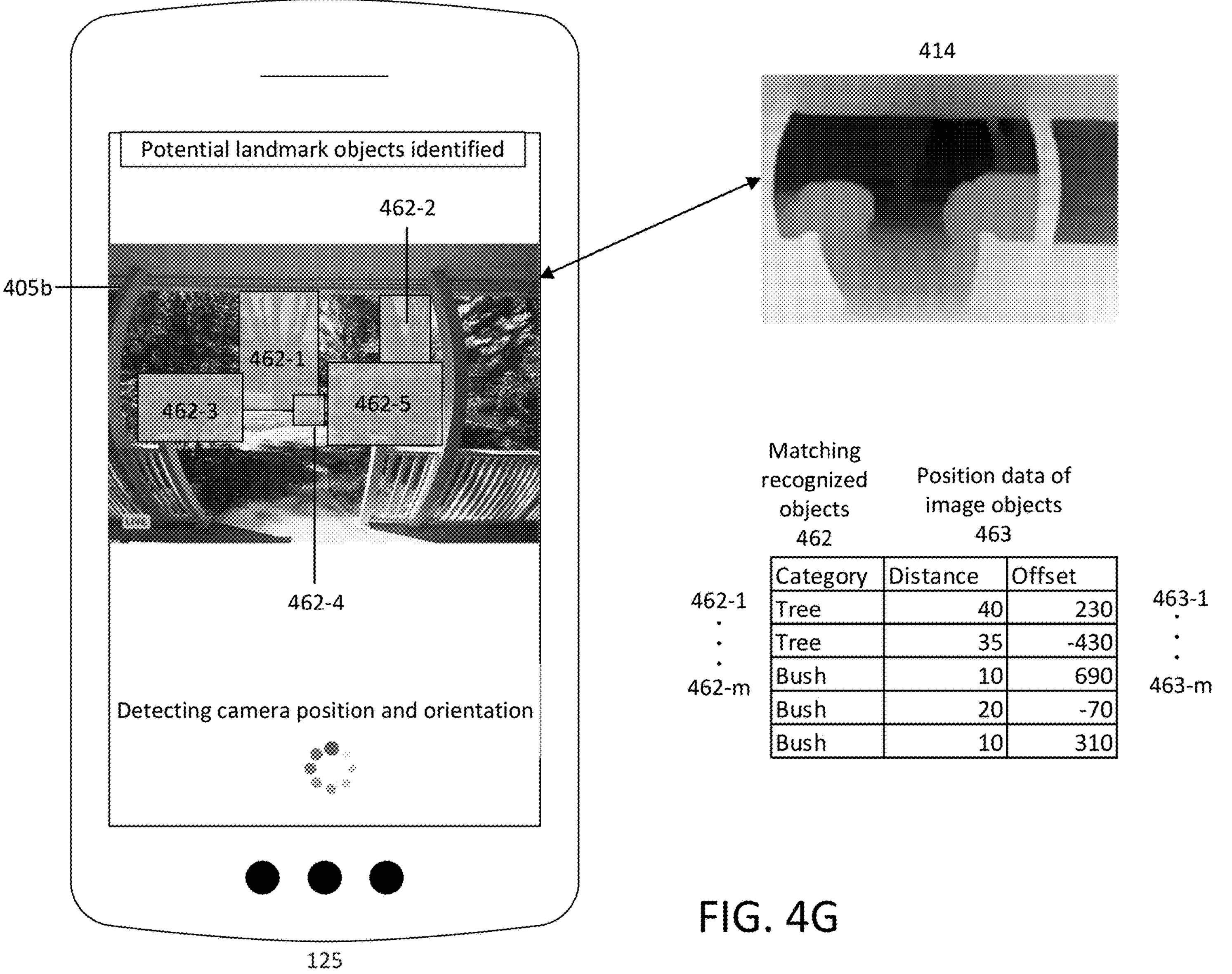

As shown in FIG. 4G, camera image landmark objects 462 may be recognized in the base image 405*b*. Whereas map-view image landmark objects 442 may be recognized and/or categorized by application of a model trained and/or programmed to recognize objects from the map-view perspective (e.g., from above the premises 102*a*), the camera image landmark objects 462 may be recognized and/or categorized by application of a model trained and/or programmed to recognize objects from a perspective of the camera 301 (e.g., approximately from the side, towards a horizon, etc.). If no camera image landmark objects 462 are recognized, the method may proceed to step 713 without landmark matching. An indication of the one or more camera image landmark objects 462 may be output for confirmation and/or selection (e.g., by a user associated with the premises 102*a*, by an operator at a remote office, like the local office 103. The recognized camera image landmark objects 462 are individually indicated in FIG. 4G as 462-*j* for integer j (e.g., 462-1 to 462-5, or generally 462-1 to 462-*m* for m recognized camera image landmark objects 462).

Information associated with the camera image landmark objects 462 may be determined and/or stored (e.g., in a table and/or a database). For example, the information may be stored in a table, similar to table 466, comprising entries for the camera image landmark objects 462 (e.g., after being accepted and/or edited by a user, and/or as recognized). An entry for a given camera image landmark object 462-*j* may comprise corresponding category value 464-*j* and/or position information 465-*j*. The position information 465-*j* may indicate one or more positions (e.g., pixel coordinates) within the base image 405*b* of the camera image landmark object 462-*j*, and/or distance values at corresponding positions in the distance map 414. The position information 465-*j* may indicate positions in the base image 405*b* determined to be part of the camera image landmark object 462-*j* (e.g., a representative position of the camera image landmark object 462-*j*, such as a center-of-mass of the camera image landmark object 462-*j*, one or more border positions of the camera image landmark object 462-*j*, etc.). A representative position of the camera image landmark object 462-*j* may comprise a position on a border of the landmark object 462-*j* (e.g., a closest position determined using corresponding distance data of the distance map 414, a farthest left/right position of the camera image landmark object 462-*j*, a position on a top of the camera image landmark object 462-*j*, etc.) because such border positions may also be visible from a perspective of the map-view image 427, which may make comparing position information of matched landmark objects more accurate.

Matching may be performed between one or more map-view image landmark objects 442 and one or more camera image landmark objects 462. Matching between the one or more map-view image landmark objects 442 and the one or more camera image landmark objects 462 may be performed to determine and/or update one or more of the camera position 425, the camera orientation 426, and/or a camera field-of-view 473. Landmark matching may be performed manually (e.g., using user input). For example, the base image 405*b* indicating the camera image landmark objects 462 may be output with the map-view image 427 indicating the map-view image landmark objects 442, and the user may be able to tap and/or click matching pairs of landmark objects in each image. Also, or alternatively, matching may be performed automatically.

Figure 4H:
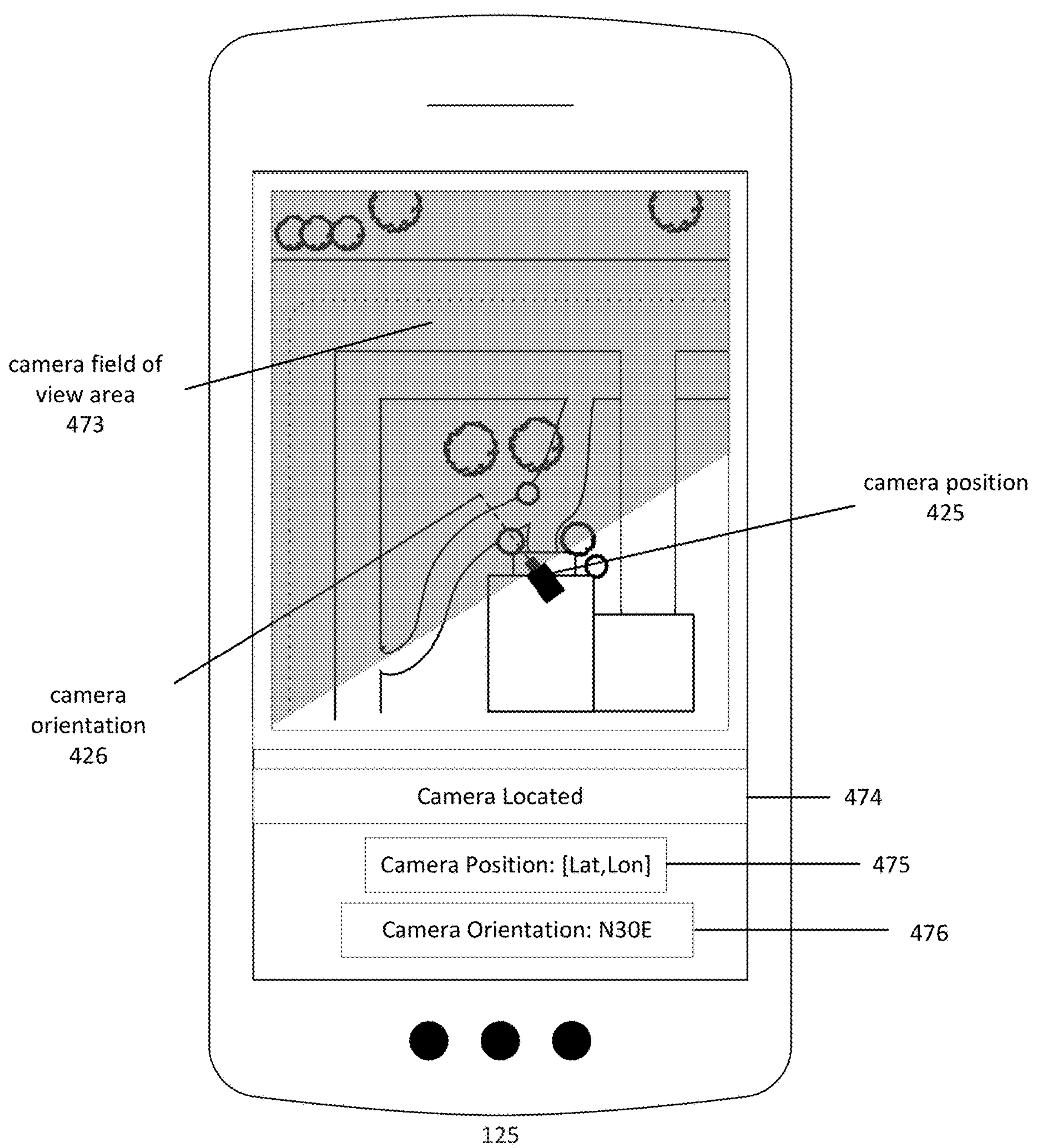

One or more camera image landmark objects 462 may be matched with one or more map-view image landmark objects based on matching category values 464 and 444, respectively, and/or by comparing relative position information 465 and/or 445. For example, a camera image landmark object 462-*j* with category value 464-*j* may be matched with a map-view image landmark object 442-*i* with same category value 444-*i*. In a case that multiple camera image landmark objects 462 have category values 464 consistent with multiple map-view image landmark objects 442, relative positions of the multiple camera image landmark objects 462 in the base image 405*b* and relative positions of the one or more map-view image landmark objects 442 in the map-view image 427 may be used to match one or more of the multiple camera image landmark objects 462 to one or more of the multiple map-view image landmark objects 442 one-to-one (e.g., based on minimizing a position mismatch between corresponding matched landmark objects). Position information 465-*j* may be adjusted (e.g., scaled, translated, etc.) to be more consistent with position information 445-*i* (e.g., relative to the estimated position 425 and/or orientation 426 of the camera 301, and/or relative to position information 465-*k* of another camera image landmark object 442-*k* matched with another map-view image landmark object 442-1). Also, or alternatively, the estimated position 425 and/or orientation 426 of the camera 301 may be used as initial estimates and adjusted to determine an adjusted camera position 425, adjusted camera orientation 426, and/or the camera field-of-view 473, as shown in FIG. 4H. For example, the one or more of the camera position 425, the camera orientation 426, and/or the camera field-of-view 473 may be determined using one or more camera image landmark objects 462 matched to one or more map-view image landmark objects 442 by, for example, triangulation, scaling and/or coordinate transformation of corresponding position information 465 and/or 445. FIG. 4H shows an example screenshot that may be output with results of matching the landmark objects 442 and 462. A confirmation that the camera 301 was located 474 may be output, as may camera position values 475 (such as latitude and longitude coordinates, [Lat, Lon]) and/or camera orientation value 476 (such as direction N30E).

Landmark matching may also, or alternatively, be performed to acquire and/or associate additional information the landmark objects in the base image 405*b* that may be relevant to setting reaction rules for distance reaction zones. Landmark matching may be used to confirm a category and/or identity of a camera image landmark object 462. For example, a camera image landmark object 462-*i* may be categorized as a street, and matching to a corresponding map-view image landmark object 442-*j* may confirm that the category is a street (e.g., as opposed to a driveway, alley, etc.), and/or identify the landmark object 462-*i* as a particular street, which may have associated security- and/or monitoring-relevant data, such as traffic patterns, traffic accident statistics, etc. A street type object may be recognized as the camera image landmark object 462-*i* and matched with the another street type map-view image landmark object 442-*j*. The map-view image 427 may comprise and/or be associated with metadata including street names and corresponding traffic data (high traffic times, low traffic times, road closures, etc.). The traffic data may be pulled and stored with the camera image landmark object 462-*i* for use in determining suggested reaction rules for a distance reaction zone comprising some or all of the camera image landmark object 462-*i* and/or may be used in determining similar premises 102 for suggested distance reaction zones and/or corresponding reaction rules (e.g., premises 102 adjacent to similarly trafficked).

Landmark matching may also, or alternatively, be used to determine distance for generating and/or updating the distance map 414. For example, distances may be determined between the map-view image landmark objects 442 and the camera position 425, and those distances may be corresponded to matched recognized camera image landmark objects 462 in the base image 405*b*. These distances may be used as ground-truth reference distances and/or scaling and/or other calibration for a distance estimation model used to generate the distance map 414 and/or may be used to update and/or improve accuracy of the distance map 414.

In step 713, one or more suggested distance reaction zones may be determined for the premises 102*a* and/or the area 300. Suggested distance reaction zones may facilitate set-up and/or configuration of the camera 301 and/or monitoring system 310 to perform image-based detection using distance data. If a user of the premises 102*a* does not have to set up distance reaction zones and corresponding reaction rules from scratch and is provided with suggested distance reaction zones to apply as-is and/or as a starting point to modify as desired, the user may be more inclined to implement distance reaction zones in the monitoring system 310 for the premises 102*a*.

Suggested distance reaction zones may be determined for the premises 102*a* based on one or more attributes of the premises 102*a* and/or based on distance reaction zones for one or more similar premises 102 (e.g. similar premises 102 may be premises 102 sharing one or more attributes with the premises 102*a*). Attributes of the premises 102*a* may comprise, for example, a property type of the premises 102*a* (e.g., residential, commercial and/or land), a type of a building on the premises 102*a* (e.g., a single-family home, a multi-family home, a condominium and/or an apartment, a townhouse and/or a type of business), household data associated with the premise 102*a* (e.g., a household size and/or household demographics), neighborhood information (e.g., city and/or zip code, school zone, crime statistics, weather, transit routes, points of interest, unemployment rates, and/or demographics), a plot size of the premises 102*a*, a physical characteristics of a building on the premises 102*a* (e.g., a size and/or shape of a footprint of the building, a number of floors of the building), a position and/or orientation of the building on the premises 102*a*, and/or structural features on and/or near the premises 102*a* (e.g., a walkway, a garage, a porch, a window, a yard, a fence, a parking lot, a distance of a building on the premise 102*a* to a street and/or another premises 102). The structural features of the premises 102*a* may comprise one or more of the identified in the map-view image landmark objects 442 and/or camera image landmark objects 462. Also, or alternatively, the structural features may be indicated in associated metadata of the map-view image 427 and/or of the premises 102*a*, such as a floorplan for a building on the premises 102*a*.

The suggested distance reaction zones may be defined by one or more distance boundaries which may be determined at least in part on one or more of the attributes of the premises 102*a*. The one or more distance boundaries may be defined by a distance to one or more points in the area 300 and/or by a position of one or more of the structural features on and/or near the premises 102*a*. For example, a distance reaction zone may be defined by a far boundary of 10 feet from the camera 301 and/or a boundary to a far edge of a porch. Another example of a distance reaction zone may be defined by a near boundary of 10 feet from the camera 301 and a far boundary of 30 feet and/or to an edge of a property line of the premises 102*a*. The distance reaction zone may be associated with corresponding reactions and/or reaction rules which may control how the distance reaction zone should be monitored. For example the reaction rules may indicate types of monitoring to be performed in the reaction zone (e.g., motion detection, facial recognition, object detection, etc.), when the different types of monitoring should be performed (e.g., what rules should apply at different times of day, week, month, etc., based on a schedule of a user of the premises 102*a*, an operating status of the premises 102*a*, and/or nearby traffic patterns). The reaction rules may comprise rules that apply given an alert status of the monitoring system 310 and/or of one or more sensors thereof, a location of one or more users and/or mobile devices 125 of the premises 102*a*, and/or a status of an expected event (e.g., a package delivery, a holiday, etc.).

The one or more suggested distance reaction zones may be determined and/or generated based on a comparison between the premises 102*a* and one or more other premises 102 to determine one or more similar premises 102. Based on the comparison, one or more similar premises 102 to the premises 102*a* may be determined and/or selected. The one or more suggested distance reaction zones may be based on one or more distance reaction zones and/or monitoring settings associated with the one or more similar premises 102. The comparison may comprise a comparison of at least some of premises metadata associated with the premises 102*a* and/or corresponding premises metadata associated with one or more other premises 102. The premises metadata for premises 102*a* and/or the corresponding premises metadata for other premises 102 may be retrieved based on location information for the premises 102*a* and/or the one or more other premises 102 (e.g., as in step 711). The premises metadata may also, or alternatively, be retrieved from one or more public records for the premises 102*a* and/or 102 (e.g., property data, such as ATTOM data, and/or map-view image metadata for a map-view image 427 associated with the premises 102*a* and/or 102). Also, or alternatively, the premises metadata for premises 102*a* and/or premises 102 may be received as and/or retrieved based on user input (e.g., as in step 701, based on user input to create an account, and/or sign in to a user account, by inputting user information 402 and/or information about the premises 102*a*, the area 300 and/or the camera 301, such as location information 403, and/or other user/household information, such as occupant numbers and/or demographics). The one or more other premises 102 may be associated with one or more other user accounts and/or other cameras monitoring other areas. The premises metadata associated with premises 102*a* and/or the corresponding premises metadata associated with the one or more other premises 102 may be stored (e.g., in the user data store, which may, as above, also store user information). The premises metadata associated with the premises 102*a* and/or the corresponding premises metadata associated with the one or more other premises 102 may be stored in a corresponding and/or centralized data structure (e.g., in the user data store), which may enable easy comparison between the premises 102*a* and/or the one or more other premises 102.

The comparison between the premises 102*a* and the one or more other premises 102 may be a comparison of one or more attributes of the premises 102*a* and one or more corresponding attributes the one or more other premises 102. For example, the comparison may comprise a comparison of a property type of the premises 102*a* to property types of the one or more other premises 102. If the premises 102*a* is a residential property, the one or more similar premises 102 may be determined by selecting other residential properties of the one or more other premises 102. If the premises 102*a* is a commercial property, the one or more similar premises 102 may be determined by selecting other commercial properties of the one or more other premises 102. If the premises 102*a* comprises a townhouse, the one or more similar premises 102 may be determined by selecting one or more of the other premises 102 that comprise townhouses. Some attributes may be determined to be similar within a range. For example, the one or more similar premises 102 may be determined to be similar if they are within a threshold distance from a location of the premises 102*a* and/or within another shared geographic region, such as a same county, city, ward, neighborhood, school district, etc. The one or more similar premises 102 may be determined to be similar if they have a plot size within a predetermined range of the premises 102*a* (e.g., ±100 square feet of a plot size of the premises 102*a*). Also, or alternatively, the one or more similar premises 102 may be determined as similar if they have an attribute that satisfies a same criteria as a corresponding attribute of the premises 102*a*. For example, the one or more similar premises 102 may be determined to be similar if the one or more similar premises 102 and the premises 102*a* each have a household size within a predefined range (e.g., greater than 3 members). The one or more similar premises 102 may be determined based on sharing one or more structural attributes with the premises 102*a*. For example, if the premises 102*a* is a corner lot, the one or more similar premises 102 may be determined by identifying the other premises 102 that are also corner lots. Some structural features may have safety implications such as a pool and/or other water feature, a fence and/or gate and/or lack thereof, entrances/exits (e.g., doors and/or windows, main and/or emergency, numbers relative to building size/occupancy), distances from the entrances/exits to a street and/or driveway and/or parking lot, etc. The one or more similar premises 102 may be determined based on sharing a presence and/or absence of the structural features having safety implications. If the premises 102*a* is within a distance (e.g., a threshold distance) from a resource, such as safety services (e.g., police, hospital, fire station, etc.), a freeway and/or freeway entrance, a bus and/or metro stop/station, a school, a grocery store, pharmacy, etc., the one or more similar premises 102 may be determined based on being within the distance. Alternatively, if the premises 102*a* is outside of a distance from such resources, the one or more similar premises 102 may be determined based on also being outside of the distance from such resources (e.g., the one or more similar premises 102 may be determined based on being similarly far from a police station). The comparison may also, or alternatively, comprise comparing (e.g., pixel value and/or pattern matching) the distance map 414 with one or more distance maps of the one or more other premises 102.

The suggested distance reaction zones may be determined by selecting the distance reaction zones of the one or more other similar premises 102 and/or adapting the distance reaction zones of the one or more other similar premises 102 to the premises 102*a*. For example, if a single similar premises 102 is determined, distance reaction zones associated with the single similar premises 102 may be selected and/or adapted for use as the suggested distance reaction zones for the premises 102*a*. If multiple similar premises 102 are determined based on the comparison above, one or more distance reaction zones associated with the multiple similar premises 102 may be selected and/or combined to determine the suggested distance reaction zones for the premises 102*a*. For example, the distance reaction zones associated with the multiple similar premises 102 may be selected (e.g., a union and/or intersection of distance reaction zones for the similar premises 102 may be selected; modal distance reaction zones may be selected; distance reaction zones associated with a plurality and/or majority of the multiple premises 102 may be selected, etc.). Also, or alternatively, the distance reaction zones of the multiple similar premises 102 may be combined (e.g., by averaging boundary data of corresponding distance reaction zones, etc.). The selected and/or combined distance reaction zones of the one or more similar premises 102 may be applied to the premises 102*a* as-is and/or may be adapted for the premises 102*a*. For example the selected and/or combined distance reaction zones of the one or more similar premises 102 may be scaled based on relative sizes of the premises 102*a* and the one or more similar premises 102, and/or based on relative distances between the camera 301 to references features, such as an edge of a porch, a fence, a street, etc. For example, a distance reaction zone associated with a similar premises 102 may be a distance reaction zone defined by a boundary distance of 10 feet from the camera installed at the similar premises 102. The exemplary distance reaction zone may be applied as a distance reaction zone defined by a boundary distance of 10 feet from the camera 301. Also, or alternatively, the distance reaction zone may be scaled based on a distance from the camera installed at the similar premises 102 to a landmark object (e.g., a street) relative to a corresponding distance from the camera 301 to a similar landmark object (e.g., a street). As an example, if the camera installed at the similar premises 102 is 40 feet from a nearest street, and the camera 301 is 30 feet from a nearest street, the distance reaction zone defined by the boundary distance of 10 feet from the camera at the similar premises 102 may be scaled and a corresponding suggested distance reaction zone for the premises 102*a* may be a distance reaction zone defined by a boundary distance of 7.5 ft. Also, or alternatively, for selected and/or combined distance reaction zones defined based on positions of one or more landmark objects (e.g., an edge of a porch, a street, a property line, etc.), the distance reaction zones may be adapted for the premises 102*a* based on distances of analogous landmark objects relative to the camera 301 and/or the premises 102*a*.

Suggested reaction rules for the suggested distance reaction zones may be determined using the reaction rules for the distance reaction zones of the one or more similar premises 102 that were used to deter. For combined distance reaction zones, the reaction rules may be selected and/or combined from reaction rules associated with the distance reaction zones used to determine the combined distance reaction zones. For example, the reaction rules may be selected (e.g., by taking a union or intersection of reaction rules associated with the combined and/or selected distance reaction zones, based on the reaction rules being associated with a minimum number of the combined and/or selected distance reaction zones, etc.). The selected and/or modified reaction rules may also, or alternatively, be modified based on the premises 102 and/or a user associated with the premises 102. For example, the selected and/or combined reaction rules may relate to detecting a motion of a dog and/or operating lights (e.g., flashing if a package arrives). The premises 102*a* may be associated with a cat and may not have smart lights, but may have a speaker system. The selected and/or combined reaction rules may be modified for the premises 102 by removing the rules related to the motion of the dog and/or the operating of lights). Also, or alternatively, the selected and/or combined reaction rules may be modified by replacing the rules for detecting motion of a dog with rules for detecting motion of a cat and/or may replace rules for operating lights with rules for operating the speaker (e.g., outputting a noise if a package arrives).

The suggested distance reaction rules may also, or alternatively, be generated and/or determined based on predefined distance reaction zones associated with one or more premises attributes (e.g., preprogrammed and/or not necessarily based on a comparison between the premises 102*a* and other premises 102). The predefined distance reaction zones may be defined and/or programmed by a user and/or manufacturer input with or without additional information associated with existing and/or former distance reaction zones of premises 102. The predefined distance reaction zones may be defined for one or more different premises attributes. For example, there may be default predefined distance reaction zones and/or sets of distance reaction zones for residential premises, commercial premises, ranches, apartments, indoors, outdoors, a porch, a yard, multifamily households, etc. The predefined distance reaction zones may be determined (e.g., selected and/or adapted from the predefined distance reaction zones) based on one or more attributes of the premises 102*a* and the corresponding predefined distance reaction zones. A user (e.g., of the premises 102*a*) may be able to select from the predefined distance reaction zones and/or suggested distance reaction zones for the premises 102*a*.

Figure 5A:
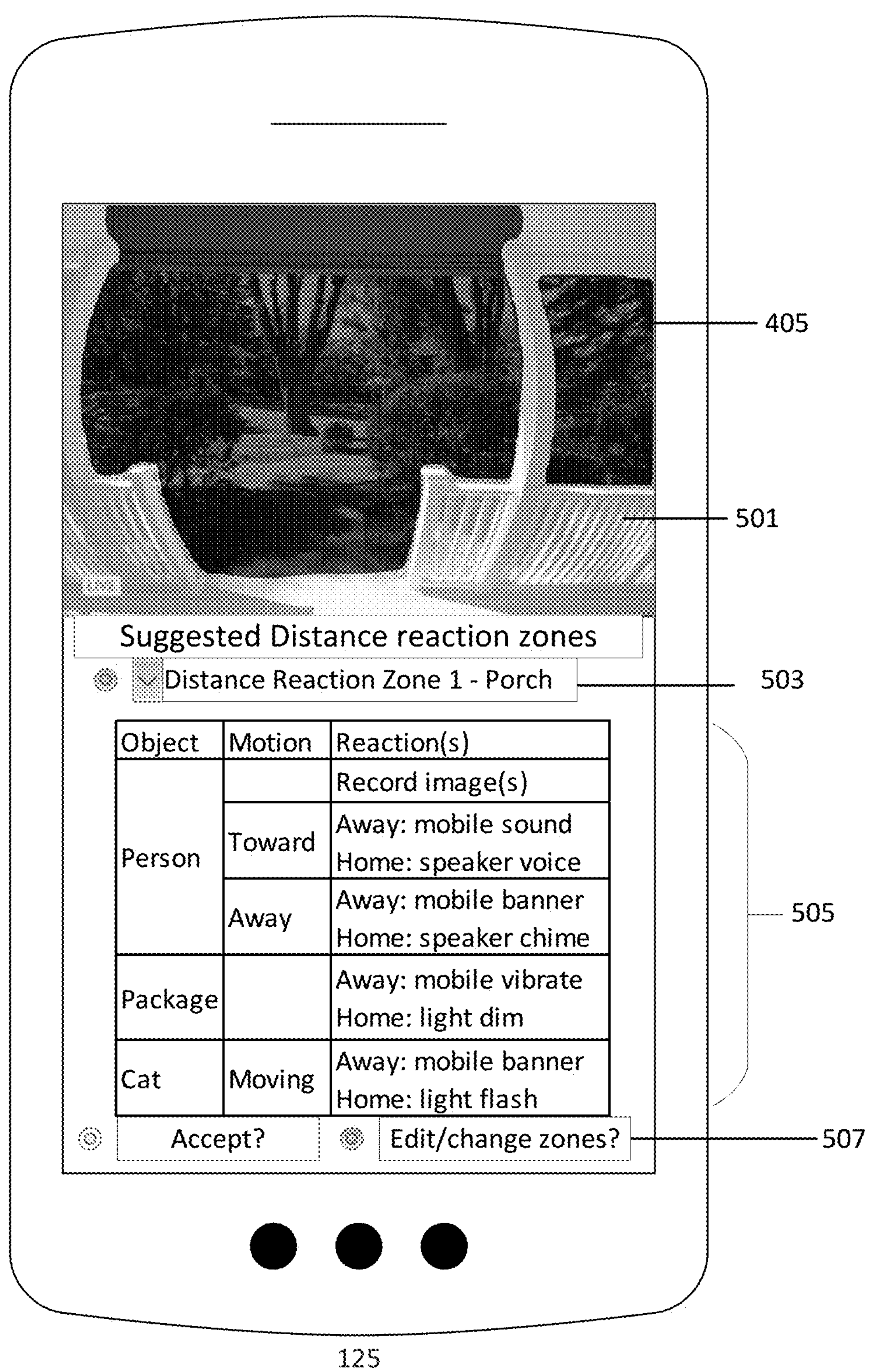
FIGS. 5A-5G show example screenshots corresponding to steps of the method for image-based detection using distance data in FIG. 7B.

In step 721, if one or more suggested distance reaction zones were determined in step 713, information indicating the one or more suggested distance reaction zones and/or corresponding reaction rules may be output. FIG. 5A shows an example interface that may be output to allow a user to view the suggested distance reaction zones and corresponding reaction rules. The interface may include an option 503 to select a suggested distance reaction zone to view information about. A sample image 405 captured by the camera 301 may be output at the interface, and the image 405 may include a highlighted region 501 to indicate objects and/or features of the image 405 that are (or are not) within a currently-selected distance reaction zone. In the FIG. 5A example, a suggested distance reaction zone may have been generated by identifying other premises 102 similar to the premises 102*a*. The other similar premises 102 may have been determined to have a first distance reaction zone from a near distance boundary (e.g., 0 ft, at a camera of the other similar premises 102) to a far distance boundary (e.g., 5 ft, a distance to a far edge of a porch, a distance to an identified walk-way, etc.). A corresponding suggested distance reaction zone may have been generated for the premises 102*a*. In FIG. 5A, the porch, porch fence and posts are highlighted in the highlighted region 501, to indicate that those objects are within the far boundary from the camera 301, according to the distance data in the distance map 414. Other suggested distance reaction zones may be selected, and the highlighted region 501 may be dynamically updated to reflect the objects and features in the image 405 that fall within those other suggested distance reaction zones.

Suggested reaction rules 505 may be output with selection of a corresponding suggested distance reaction zone. The example of FIG. 5A indicates suggested reaction rules 505 for reacting to people, packages, and a pet cat detected in images 405 and determined to be within suggested distance reaction zone 1. The suggested reaction rules 505 may indicate different reactions performed based on various additional information, such as whether a user is away from the premises 102*a* ("Away") and/or at the premises 102*a* ("Home") (e.g., the user may be determined to be "Away" or "Home" using, e.g., a location of the mobile device 125, a schedule of the user the status of the motion sensor 317, operation of devices at the premises 102*a*, such as display device 112, etc.). In the example of FIG. 5A, for a person-type object detected and determined to be within distance reaction zone 1 (e.g., as will be discussed in more detail with respect to steps 737-743), the suggested reaction rules 505 indicate a rule to record images 405 in which the person is detected, a rule to output an audible alert at the mobile device 125 if the user is away and the detected person is determined to be moving toward the camera 301, a rule to output a voice announcement (e.g., "visitor approaching") at the speaker 321 if a user is home and the detected person is determined to be moving toward the camera 301, a rule to output an banner notification at the mobile device 125 if the user is away and the detected person is determined to be moving towards the camera 301, a rule to output a chime noise at the speaker 321 if a user is home and the detected person is determined to be moving toward the camera 301. For a package-type object detected and determined to be within distance reaction zone 1, the suggested reaction rules 505 indicate a rule to output a vibration alert at the mobile device 125 if the user is away, and a rule to dim a light 320 if a user is home. For a cat-type object detected and determined to be in motion within distance reaction zone 1, the suggested reaction rules 505 indicate a rule to output a banner at the mobile device 125 if the user is away and a rule to flash light 320 if a user is home.

Other distance reaction zones may also, or alternatively be output for review by the user, such as previously used distance reaction zones (e.g., used at the premises 102*a*, used with the camera 301, used at another premises 102 associated with a user account of a user of the premises 102*a*, etc.). For example, if no suggested distance reaction zone was generated and/or determined for the premises 102*a*, one or more previously used distance reaction zones may be output for review in an interface similar to the example of FIG. 5A. An option 507 to accept the suggested distance reaction zones and corresponding suggested reaction rules (and/or any other output distance reaction zones and corresponding reaction rules) and/or to configure and/or modify and/or select different distance reaction zones may be output at the interface.

In step 723, it may be determined whether there has been a request to configure and/or modify distance reaction zones and/or corresponding reaction rules for the premises 102*a*. For example, if user input is received (e.g., by selection of "Accept?" in the interface depicted in FIG. 5A) to accept the suggested distance reaction zones and/or one or more other distance reaction zones, it may be determined that no request has been made to configure and/or modify distance reaction rules and/or corresponding reaction rules for the premises 102*a* (723—N). If user input is received (e.g., by selection of "Edit/change zones?" in the interface depicted in FIG. 5A) to configure and/or modify distance reaction zones, and/or if no suggested distance reaction zones or other distance reaction zones exist for the premises 102*a*, a request to arm the monitoring system 310 and/or camera 301 may be determined to comprise a request to configure distance reaction zones and corresponding reaction rules. (723—Y).

Figure 5B:
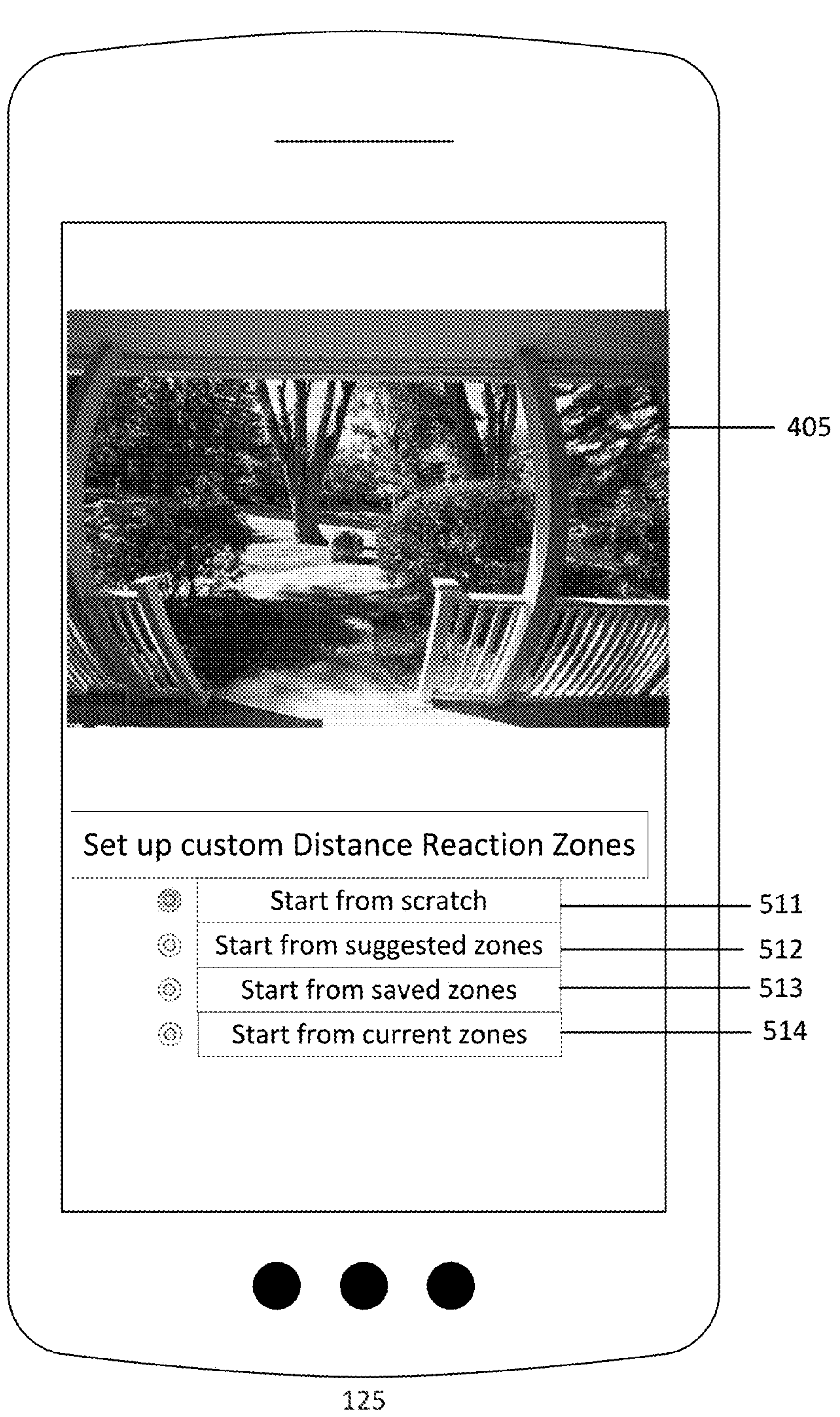

The determined request may comprise a request to configure (e.g., generate and/or set-up) new distance reaction zones and/or to configure and/or modify existing distance reaction zones (e.g., current and/or most recently applied distance reaction zones, saved distance reaction zones, default distance reaction zones and/or suggested distance reaction zones for the premises 102*a*). For example, FIG. 5B shows an example interface that may be output (e.g., in response to a selection of "Edit/change zones?" in option 507) to enable a user to specify a request to configure a new distance reaction zone (e.g., an option 511 to start from scratch), an option 512 to start from suggested distance reaction zones, an option 513 to start from saved distance reaction zones (e.g., previously used), and/or an option 514 to start from current distance reaction zones (e.g., most recently and/or currently implemented distance reaction zones). Distance reaction zones and/or corresponding reaction rules may be saved manually (e.g., by a user selecting a save option and/or favoriting the distance reaction zones) and/or automatically once generated, configured and/or modified. The distance reaction zones associated with the premises 102*a* may be saved in a storage associated with the user data store (e.g., a database of the user data store) so as to easily associate the distance reaction zones and/or corresponding reaction rules with the premises 102*a*, a user account associated with the premises 102*a*, and/or any monitoring and/or security events determined to have occurred in saved the distance reaction zones.

Figure 5C:
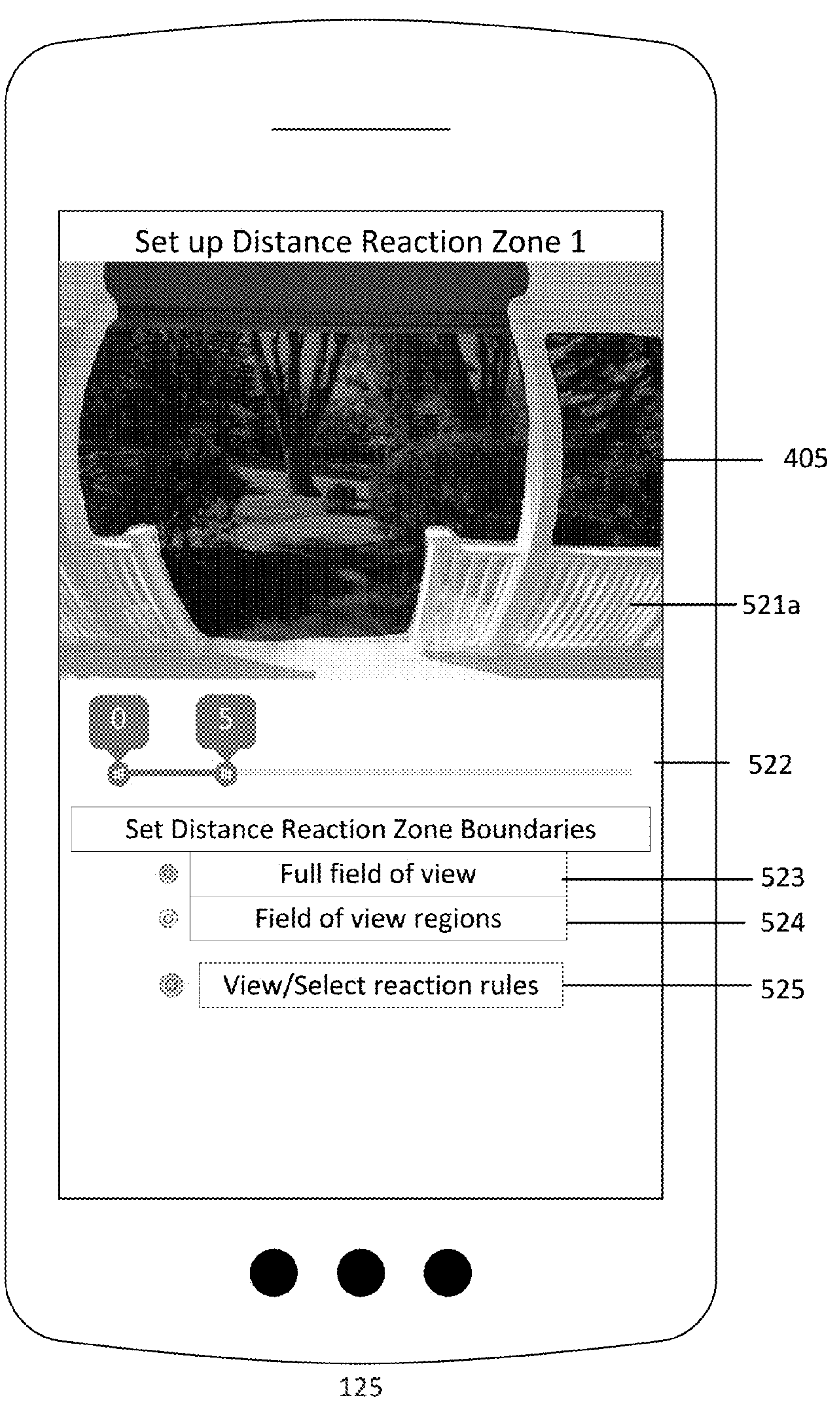
Figure 5D:
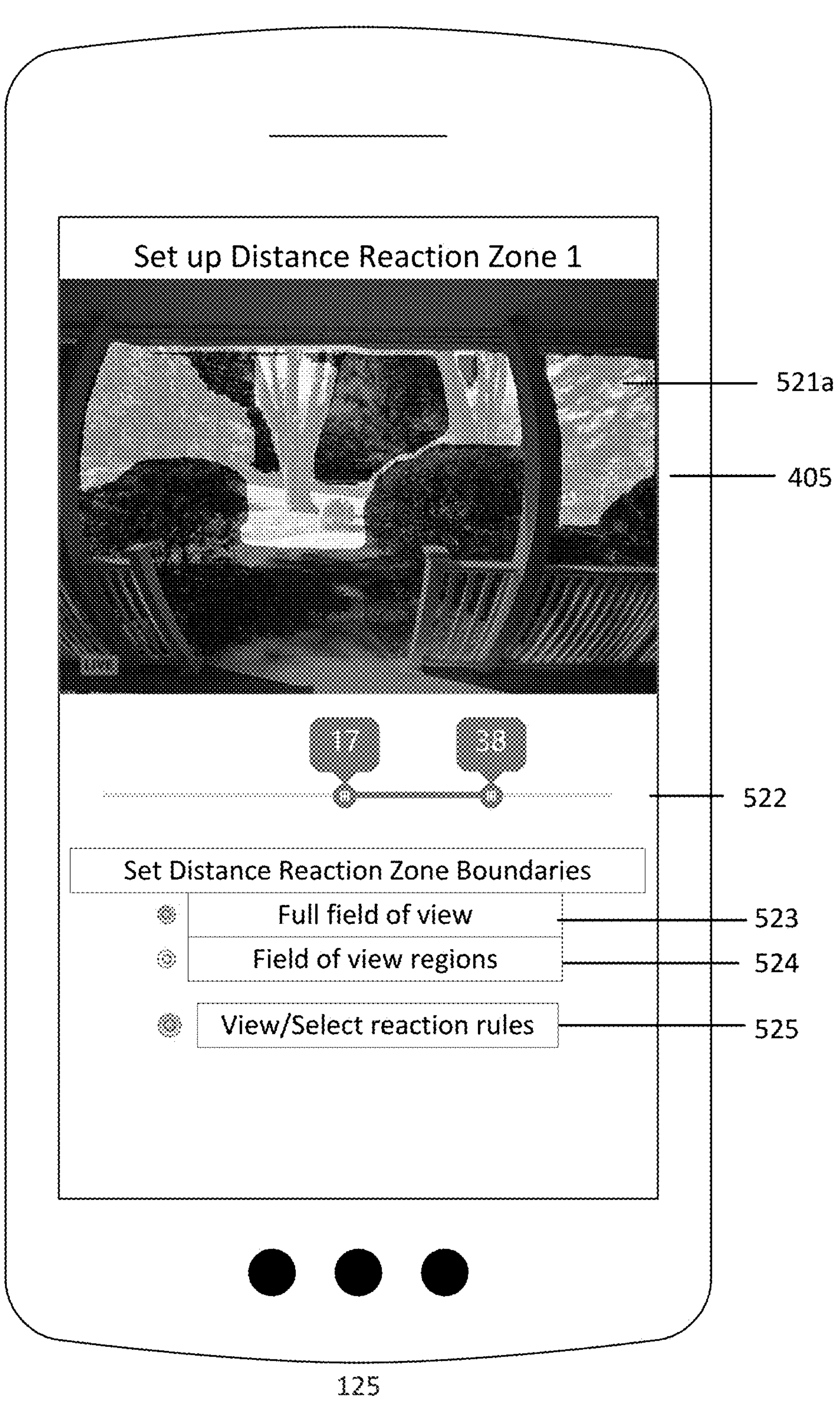

If a request to configure and/or modify a distance reaction zone was received in step 723 (723—Y), an option to configure and/or modify distance reaction zones may be output in step 725. FIGS. 5C-D show an example of an interface that may be used to configure parameters of a distance reaction zone and corresponding reaction rules to indicate what action(s) should be taken if certain objects and/or motion are detected within the distance reaction zone. The interface may include an input tool, such as slider bar 522, to allow a user to input and/or control distance parameters for the distance reaction zone. The distance parameters may define a near boundary and a far boundary of the distance reaction zone, and they may be expressed as distance measured from the camera 301. If the determined request to configure and/or modify distance reaction zones is a request to modify one or more existing distance reaction zones (e.g., a suggested distance reaction zone), distance parameters of the existing distance reaction zone may be output by populating data fields in a data structure for the interface with data values of the existing distance reaction zone. For example, the data fields for a distance reaction zone may comprise distance parameters for the existing distance reaction zone, and those distance parameters may be loaded in the slider bar 522 for the user to adjust and/or modify.

The interface may include an image 405 captured by the camera 301, and the image 405 may include a highlighted region (e.g., 521*a* in FIGS. 5C and 521*b* in FIG. 5D) to indicate the objects that are (or are not) within the currently-selected distance parameters of the distance reaction zone. In the FIG. 5C example, the porch fence and posts are highlighted, to indicate that those objects are within the 0-5 foot distance range set by the slider 522. The highlighted region 521*a* may be dynamically updated as the user adjusts the range in the slider 522, and through this the user can see what portions of the camera's field-of-view will be affected by the current distance reaction zone being configured. For example, in the FIG. 5D example, the distance range set by the slider has been adjusted to 17-38 ft and corresponding objects and features in the image 405 (e.g., determined using the distance map 414, generated using the base image 405*b*) are included in the updated highlighted region 521*a*, which reflects the adjusted distance parameters indicated by the slider 522 in FIG. 5D.

Figure 5E:
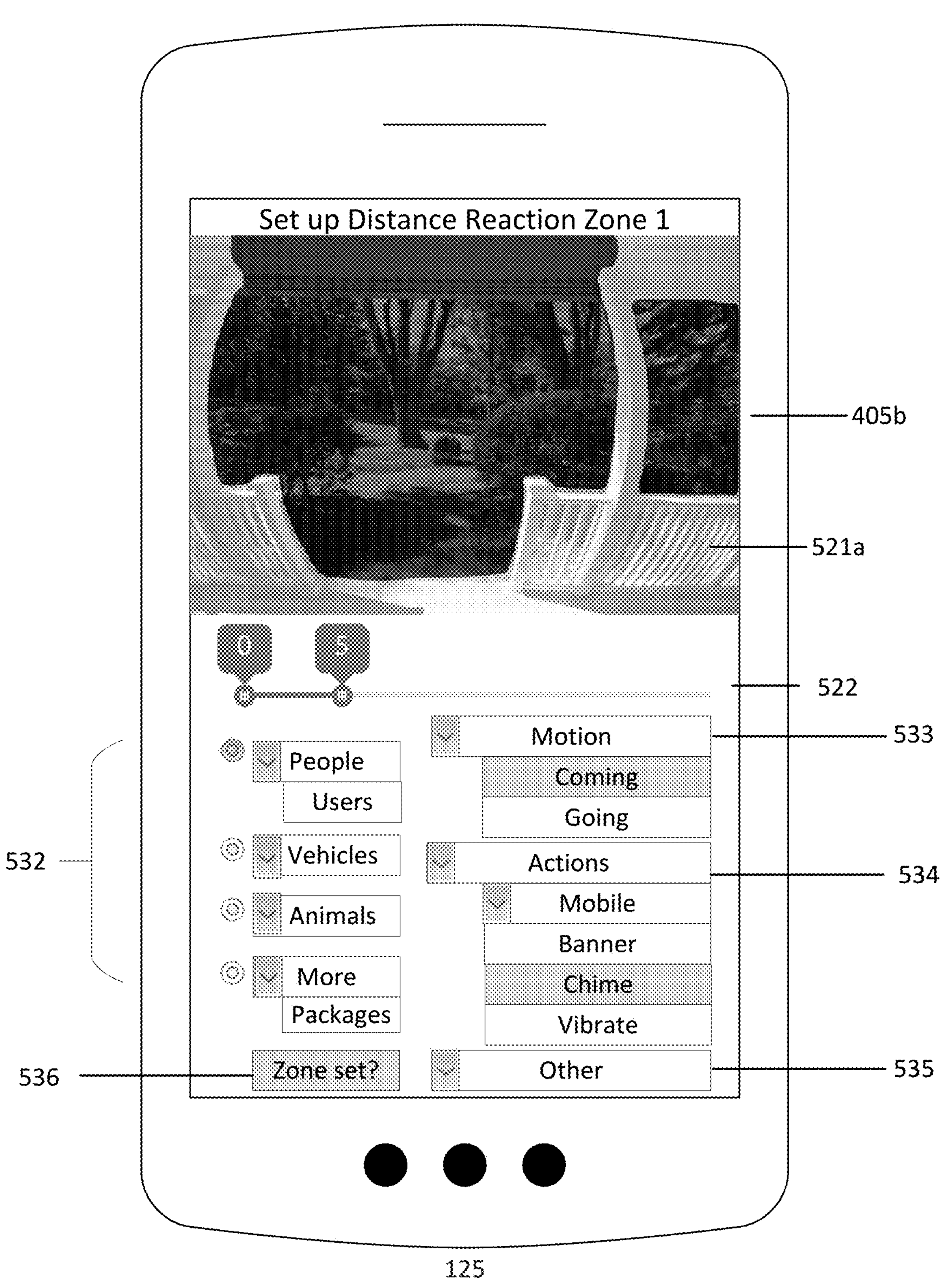

The interface may also include an option 525 to configure and/or modify reaction rules corresponding to the distance reaction zone being configured and/or modified. If a request to configure and/or modify reaction rules corresponding to the distance reaction zone being configured and/or modified is received, the interface may be output with options to view, configure and/or modify reaction rules for the distance reaction zone. FIG. 5E shows an example of output options to view, configure and/or modify the corresponding reaction rules to the distance reaction zone 1. The distance reaction rules may comprise rules for object recognition and/or categorization, as indicated by object categories 532. For a selected object category 532 (e.g., "people" is shown selected), different reactions may be set for different directions of motion of an object detected in the distance reaction zone (e.g., whether it is moving towards, away from, the camera 301, and/or in a left or right direction relative to the camera 301), and/or whether the object is not moving (e.g., is idle for a certain amount of time and/or does not move more than a certain mount over a certain amount of time, etc.) in the corresponding distance reaction zone. In the FIG. 5E example, the "people" object category 532 is selected, which indicates corresponding distance reaction rule settings will apply to detected people in distance reaction zone 1 being configured. Reaction rules can also, or alternatively, be set independent of a particular object category 532 (e.g., reaction rules may be set for detected motion of any object). The interface may also comprise an option to set different and/or specific reaction rules for specific objects of the object categories 532 (e.g., specific people, specific vehicles, specific animals, etc.). Specific objects may be specified by the user via the interface. In the FIG. 5E example, "Users" is selected in the drop-down for the people object category, indicating that the specified reaction rules will apply to recognized users of the premises 102*a*, for example. Information for identifying and/or distinguishing the specific objects may be received (e.g., by a user setting up a user account in step 701), and may indicate specific people (e.g., household members, family members, frequent visitors, neighbors, etc.), specific vehicles (e.g., a make, model, color, plate number of a vehicle), specific animals (e.g., specific species, images of a pet, registering an RF tag of a pet collar, etc.). Specific objects within a category may be recognized and/or learned using image processing and/or image-based detection, such as facial recognition, tag and/or make/model recognition for specific vehicles, animal and/or animal tag recognition, etc.

The interface may include an option to indicate types of motion 533 (e.g., of objects of a selected object category 532 and/or independent of any object category) that may trigger reactions if detected in the distance reaction zone. The user may select motion parameters to indicate that different actions should be taken based on the different types of motion detected in the reaction zone. For example, an object moving towards the camera 301 may be treated differently from an object moving away from the camera 301. Still different reaction rules may also be set for objects moving to the left or right, for idle objects, objects moving with different speeds, such as above or below a certain speed, etc. Idle objects may refer to no motion of the objects detected and/or detected motion less than a threshold amount (e.g., less than an amount progressively in a direction, less than an amount over a certain amount of time, etc.), which may allow for ignoring motion deemed insubstantial and/or random (e.g., due to gesturing, shifting weight, clothing/hair/leaves moving in wind, etc.).

The interface may include an option to set one or more actions 534 to be performed and/or output in response to a specified detection event (e.g., object and/or motion detected in the distance reaction zone). The option 534 may allow a user to select a device (e.g. "Mobile" in the example of FIG. 5E) to perform a corresponding action (e.g., output a "chime" sound in the example of FIG. 5E). The option to set actions 534 may allow a user to select any of a plurality of devices capable of receiving instructions to cause output of a reaction, such as the mobile device 125, the premises controller 311, the alarm panel 312, the gateway device 111, output devices of the premises 102*a* (e.g., the light 320, the speaker 321, the display 318, audio output device 319, etc.), sensing devices for monitoring the premises 102*a* (e.g., the camera 301, listening device 315, glass break sensor 316, motion sensor 317, etc.) and/or other devices 113 (e.g., a DVR or STB, internet of things (IoT) enabled devices, such as thermostats, personal assistant devices, etc.).

The interface may also include an option 535 to specify other criteria for the reaction rules, such as different actions to be performed based on different locations of one or more users of the premises 102*a* (e.g., if a user is at the premises 102*a*, one action may be performed, if the user is away, a different action may be performed), based on a status of the monitoring system 310 and/or sensors of the monitoring system 310 (e.g., if the monitoring system 310 is at a low alert level, fewer and/or less intrusive actions may be performed, if the monitoring system 310 is at a high alert, more and/or more intrusive actions may be performed).

An option 536 may be output to accept the distance reaction zone boundary and corresponding reaction rules for the distance reaction zone being configured and/or modified, which may cause output of an option to configure and/or modify another distance reaction zone and/or to accept current and/or default distance reaction zones.

In the examples of FIGS. 5C-5E, the distance boundaries defining the distance reaction zones are defined to have a uniform distance over the full field-of-view image 405 (e.g., as indicated by option 523, which is selected in the example interface of FIGS. 5C and 5D). However, distance boundaries defining the distance reaction zones may also, or alternatively, comprise different distances for different regions of the camera 301's field-of-view and/or portions of the area 300. In other words, a distance reaction zone boundary may be defined by a single distance value for the entire camera field-of-view, so as to define a semi-circular arc boundary from the camera 301, or the distance reaction zone boundary may be defined by a different distances from the camera 301 corresponding to different regions in the camera's field-of-view.

Figure 5F:
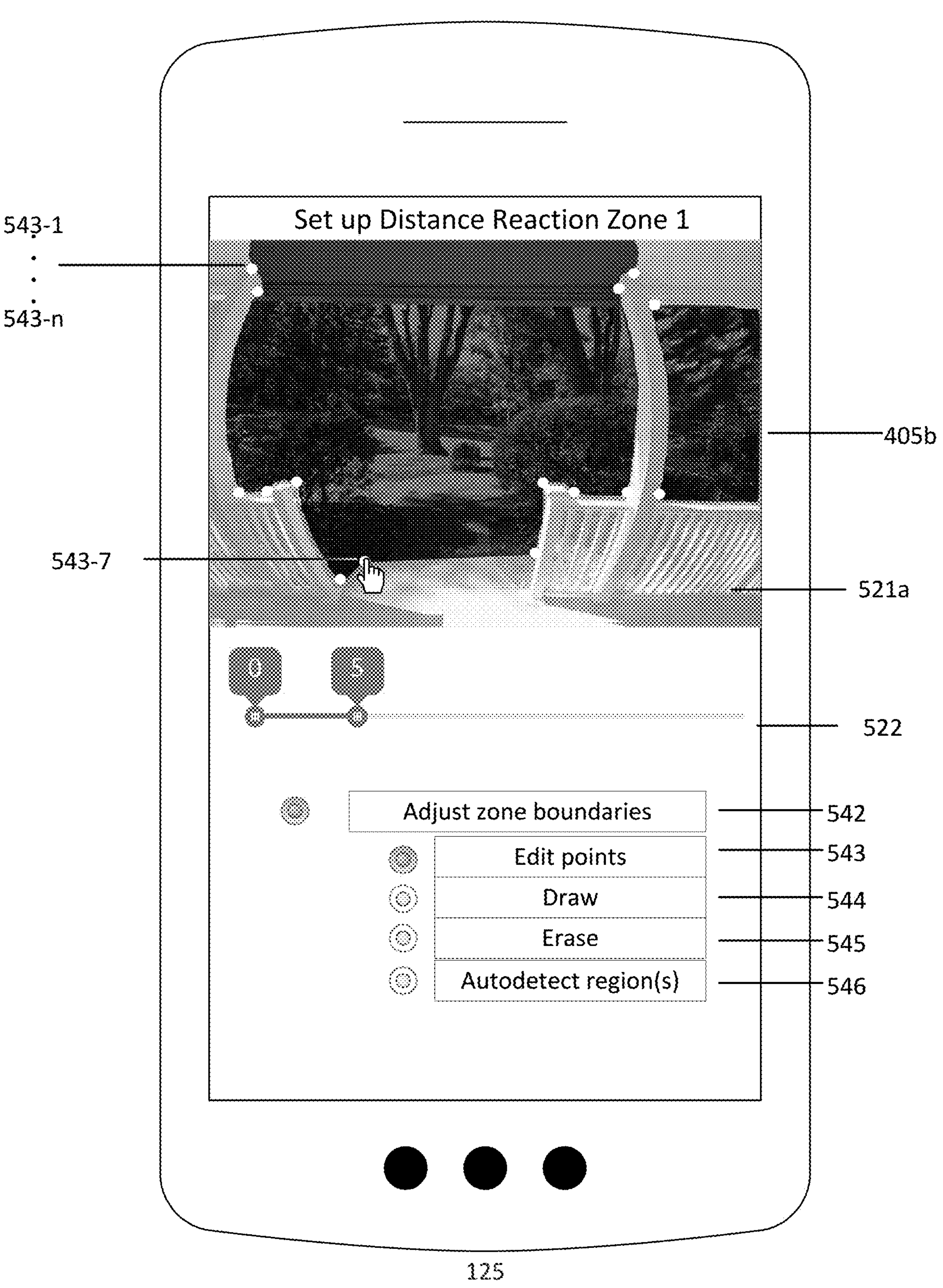

Distance reaction zone boundaries defined by non-uniform distance boundaries may be achieved in various ways. An option 524 (e.g., in the example interface of FIGS. 5C and 5D) may be output to allow a user to define a distance reaction zone with one or more non-uniform distance boundaries. For example, FIG. 5F shows an interface that may be output to provide options to adjust boundary distances 542. Various tools may be provided to enable adjusting the distance reaction zone, such as edit points 543, drawing tools 544, erasing tools 545, and/or an autodetect region tool 546. In the FIG. 5F example, edit points 543 has been selected, causing edit points to be output at various points (e.g., inflection points, at regular intervals, based on user input/placement) on the boundary of the distance reaction zone. The edit points 543-1 to 543-*n* (for integer n) may be moved (e.g., dragged and dropped across a screen of the mobile device 125) to a new position, which may cause the distance boundary between the moved boundary points and adjacent boundary points to be adjusted corresponding to distance data of the distance map 414. In particular, for any new region in the image included by the moved boundary, corresponding distance values may be determined from the distance map 414 and applied to the modified distance boundary. In other words, the boundary may be adjusted to be non-uniform from a perspective of the camera 301 (e.g., to vary in direction from the camera 301 for different directions from the camera 301). Other tools for adjusting the distance reaction zone boundary may comprise a drawing tools 544 may add and the erasing tools 545 may remove regions of the field-of-view to be included in the distance reaction zone. The autodetect region(s) tool may automatically detect regions (e.g., by image segmentation, object detection, etc.) to be added and/or removed from the distance reaction zone. For example, the autodetect option may detect regions corresponding to a lawn, to bushes, to a walkway, to a driveway, to a porch, to posts or other structures, etc. Autodetect regions may enable a user to intuitively and conveniently add and/or exclude portions of the area 300 from particular distance reaction zones. For example, a region of the image 405*b* may be autodetected to be a bush, and a user may opt to exclude the bush from the distance reaction zone, as any motion detected from the position of the bush is unlikely to be important.

Figure 5G:
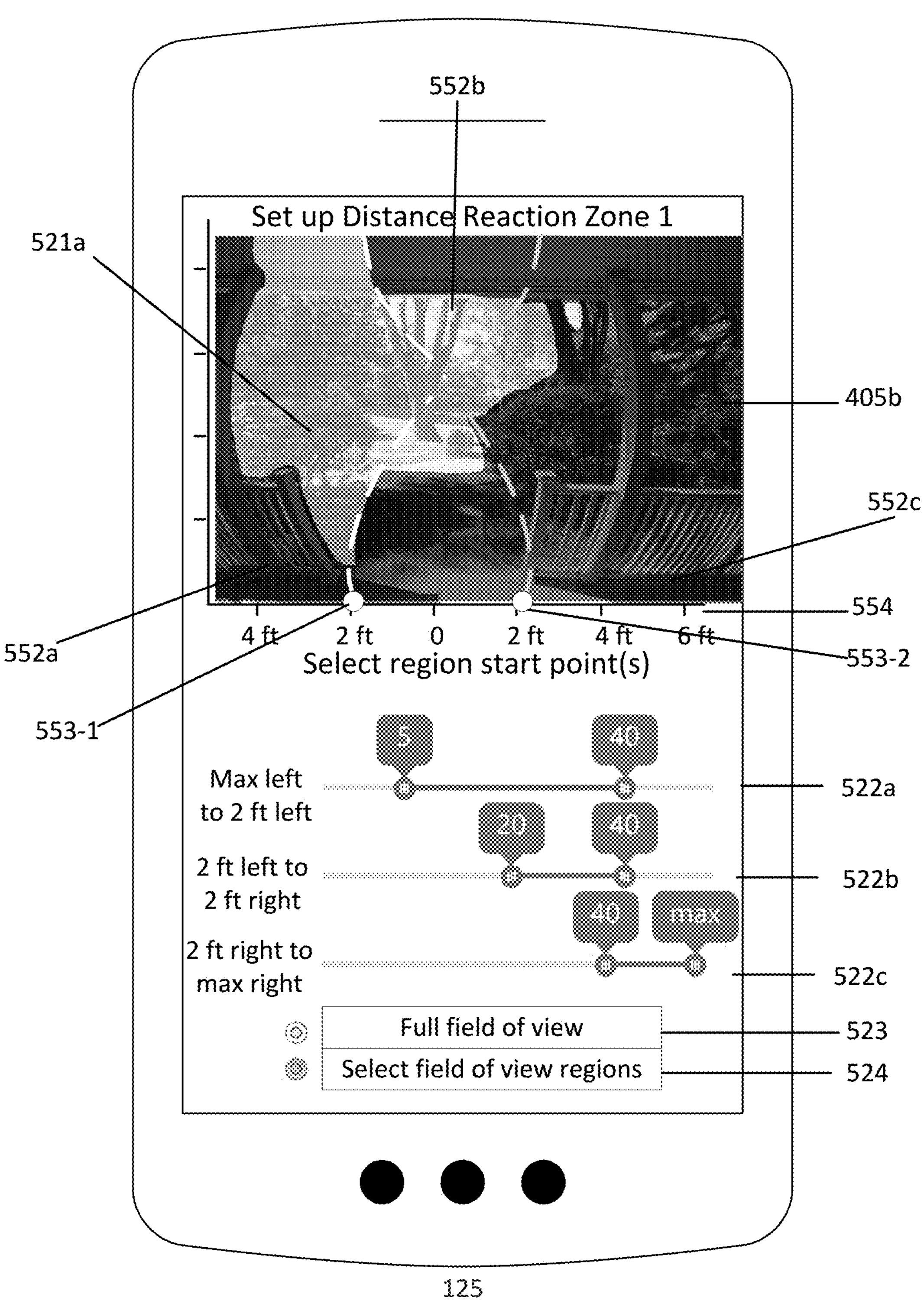

FIG. 5G shows another example interface that may be output to allow a user to define a distance reaction zone with non-uniform distance boundaries. In the FIG. 5G example, the interface allows a user to define a distance reaction zone with different distance boundary values for different portions of the camera's field-of-view. The different regions may be specified by ranges of directions from the camera 301 (e.g., ranges of angles away from the camera orientation 426) and/or ranges of offset distances from a reference direction of the camera 301 (e.g., ranges of offset distances from a line directed along the camera orientation 426). Based on selection of the option 524, an option to select the regions 551 (e.g., an option to select region start points on an axis and/or ruler 554, or other reference). FIG. 5G depicts three regions of the camera field-of-view defined by selected offsets relative to a center line of the camera field-of-view. Offsets provided by user input, e.g., by selecting one or more points on a selectable axis or other point on the base image 405*b*. For example, FIG. 5G shows selection of a first offset 553-1 to the left of the center of the camera field-of-view and a selection of a second offset 553-2 to the right of the center of the camera field-of-view. Based on the selected offsets, one or more regions 552 of the base image 405*b* may be indicated (e.g., by border lines, highlighted region, overlay of corresponding distance map values, etc.). In FIG. 5G, three regions 552*a-c* are indicated by dashed border lines, with a first region 552*a* corresponding to a portion of the area 300 more than 2 feet to the left from the camera orientation 426, a second region 552*b* corresponding to a portion of the area 300 between 2 feet to the left or right from the camera orientation 426, and a third region 552*c* corresponding to a portion of the area 300 more than 2 feet to the right of the camera orientation 426. For each region, a slider 522*a-b* (e.g., 522*a*, 522*b*, and 522*c*) or other means of inputting distance information may be output. The sliders 522*a-c* may be independently adjustable, which may enable distance for defining boundaries to be set independently in each region. As such, the distance reaction zone may comprise one or more boundaries that are different for different portions of the area 300 corresponding to the different regions of the base image 405*b*. For example, in FIG. 5G, the distance reaction zone 1 comprises a first portion of the area 300 corresponding to region 552*a*, a second portion of the area 300 corresponding to region 552*b*, and a second portion of the area 300 corresponding to region 553*c*. The first portion is further defined as between a near boundary of 5 ft and a far boundary of 40 ft. The second portion is further defined as between a near boundary of 20 ft and a far boundary of 40 ft. The third portion is further defined as between a near boundary of 40 feet and a far boundary of max (e.g., unlimited or maximum distance value in the distance map 414). The resulting distance reaction zone may be indicated in the base image 405*b*, for example by highlighted region 521*a*. Detection and/or motion events determined to belong to the distance reaction zone (e.g., determined to have occurred within the distance reaction zone), which corresponds to the highlighted region 521*a*, will be subject to the same set of corresponding reaction rules.

The determined request to configure and/or modify distance reaction zones may comprise a request to configure and/or modify a plurality of distance reaction zones. For example, once a first distance reaction zone has been configured and/or modified, an option to set up another zone may be output and/or selected. The request may comprise a request to add an additional distance reaction zone (e.g., to configure and/or generate a new distance reaction zone) and/or to select an existing distance reaction zone for modifying.

In step 727, user input configuring and/or modifying distance reaction zones may be received. The user input may be received via the options output in step 725. Also, or alternatively, input configuring and/or modifying distance reaction zones of other premises 102 may be received and/or determined to have occurred (e.g., based on data about the distance reaction zones of the other premises 102 in the user data store). In a case that the request to configure and/or modify distance reaction zones in step 723 comprises a request to configure and/or modify suggested distance reaction zones for the premises 102*a*, and the input configuring and/or modifying the distance reaction zones of the other premises 102 comprises input configuring and/or modifying distance reaction zones used to generate the suggested distance reaction zones, additional options to similarly configure and/or modify the distance reaction zones of the premises 102*a* may be output for acceptance and/or rejection, in part and/or in whole. Input may be received accepting and/or rejecting the suggested modifications. The distance reaction zones configured and/or modified based on the input received in step 727 may be stored locally (e.g., at one or more devices of the premises 102*a* configured to perform image-based detection using distance data, e.g., the premises controller 311, the mobile device 125, etc.) and/or remotely (e.g., local office 103, application server 107, such as in the user data store). For example, the configured and/or modified distance reaction zones may be stored locally so as to be used in performing image-based detection using distance data for monitoring the premises 102*a*, as described in below. Also, or alternatively, the configured and/or modified distance reaction zones and/or information indicating the configuration and/or modifications made, may be stored in a storage, such as the user data store, so as to be useable in determining suggested distance reaction zones for another premises 102 (e.g., in case the premises 102*a* is identified as similar to another premises 102, the distance reaction zones and/or corresponding reaction rules of the premises 102*a* may be used to determine and/or generate suggested distance reaction zones for the other premises 102.

One or more default distance reaction zones may be predefined and loaded for use in a case that no distance reaction zones are defined for the premises 102*a* (e.g., no distance reaction zones were determined in step 713, no distance reaction zones were saved for the premises 102*a*, the camera 301 and/or a user account associated with the premises 102*a* and/or the camera 301).

In step 735, a determination may be made as to whether a request to arm the monitoring system 310 to perform image-based detection using the loaded one or more distance reaction zones was received. If the monitoring system 310 is determined to be armed and/or a request to arm is determined to have been made and/or received (735—Y), image-based detection based on distance data may be performed using one or more images 405 received in step 737. If the monitoring system 310 is determined not to be armed and no request to arm was received (735—N), a determination may be made as to whether the one or more distance reaction zones should be modified in step 751.

In step 737, one or more images 405 may be received from the camera 301. The one or more images 405 may be received as individual images 405 and/or in a time series (e.g., as image frames in a video clip, video stream, etc.). The one or more images 405 may be received as live images 405 (e.g., the camera 301 and/or associated device may directly stream the one or more images to be processed for image-based detection) and/or at specific times (e.g., periodically, at certain times of day) and/or received in response to certain events (e.g., from a storage based on a sensor being tripped, a user location and/or change in user location, and/or a request to retrieve and/or view and/or perform image-based detection using the one or more images). FIG. 6A shows an example user interface that may be output if a user decides to access a status of the monitoring system 310 and/or requests to view images 405 from the camera 301 while the monitoring system 310 is armed. One or more images 405 may be received from the camera 301 and output for viewing (e.g., on the mobile device 125). Options 603-605 may be output to view images recorded based on previously detected events (e.g. images 405 recorded based on previous object and/or motion detection events and/or other events, such as a sensor being tripped, a scheduled delivery and/or arrival, a location of a user of the premises 102*a*, opening or closing of a business operated out of the premises 102*a*, a detection and/or other event associated with another camera at the premises 102*a* and/or nearby premises 102, etc.). For example, options 603-605 may comprise options to view images 405 associated with recent events 603 and/or favorited and/or saved events 604, and/or an option 605 to search saved images 405 and/or events (e.g., by a semantic image search). Options may be output to view/edit distance settings, including an option to view/edit distance reaction zones and settings 607 and/or to update distance data 608 (e.g., to update and/or regenerate the distance map 414). The help option 609 indicates an option to request operational help from and/or transfer operational control of the monitoring system 310 and/or the camera 301 to an external operator (e.g., an operator at the local office 103, of the application server 107, and/or another external operator with access to the user data store and/or the monitoring system 310).

In step 739, the one or more images 405 received in step 737 may be processed for object and/or motion detection. Object detection may be performed on the one or more images 405 to recognize objects of the object categories 532. Motion of detected objects may be tracked, (e.g., by tracking a change in position, a change in shape and/or a change in size of a detected object across multiple of the one or more images 405). Motion detection may be performed in addition to, or instead of, object detection and/or object recognition. For example, regions of motion and/or change may be detected by reference image subtraction, or another comparison, may be performed between the at least one images 405 and a reference image. The reference image may be selected based on a timescale and/or types of motion and/or changes to be detected in the monitored area 300 are of interest. For example, the reference image may be selected as the base image 405*b* or another previously acquired reference image, which may allow for detecting general and/or large-scale changes in the area 300 (e.g., a package was delivered, landscaping was performed, etc.), but may miss small changes and may be less suited for tracking motion direction and speed. The reference image may be selected as an initial and/or other reference frame in a video comprising the one or more images 405, which may better allow for detecting motion and/or changes that occurred during the time frame of the video clip. A local image to each image (e.g., an immediately preceding, and/or preceding by some timescale of interest) may be selected as a reference image, which may allow for better detecting motion at smaller timescales and/or timescales of interest.

In the example shown in FIG. 6B, reference image subtraction performed between successive images of a plurality of images 405-1 to 405-*n* may be used to determine one or more regions of motion (e.g., region 610). Regions of motion may be determined by identifying regions (e.g., pixels) in an image 405-*i* that changed (e.g., in one or more pixel values) relative to corresponding regions in the reference image. Regions of apparent motion and/or change may be identified and/or tagged to differentiate from apparently static regions (e.g., corresponding regions between the images 405. For example, a binary image 610 may be generated, in which pixels corresponding to pixels that changed (e.g., by at least a threshold amount) between images 405-*i* and 405-*i*-1 are indicated by a first value, (e.g., 1, white) and pixels corresponding to pixels that did not change are indicated by a second value (e.g., 0, black). Binary image 610 indicates a detected region of motion 611, with a corresponding boundary box 612.

Irrelevant motion may be filtered out and/or ignored. A region of apparent motion (e.g., a region of change between images) may be deemed irrelevant and/or ignored based on failing to satisfy one or more criteria, such as a size criterion and/or a motion quality criterion. For example, a size criterion may include a minimum size requirement, such that a region of apparent motion may be ignored and/or deemed irrelevant if it is smaller than a minimum area and/or minimum linear dimension (e.g., one to a few pixels) and/or smaller than a size of a region likely to correspond to an object of interest (e.g., an object of one or more of the categories 532). The size criteria may be based on an apparent distance of the region of apparent motion from the camera. The apparent distance may be determined by applying a distance estimation model to a region in an image 405 corresponding to the region of apparent motion, and/or based on a visual cue or assumption, such as an assumption that the object is ground-based and that a lower portion of the region of motion has a distance of a corresponding portion in the distance map 414 (e.g., a lower portion of the region of motion may be assumed to be in contact with ground or other surface in the base image 405*b* for which a distance was determined to generate the distance map 414). For example, the region of motion 611 in FIG. 6B may have a lowest point that corresponds to a position of the distance map 414 having a distance value of 8 ft, which may correspond to a minimum size (e.g., one or more minimum linear sizes in one or more dimensions, a minimum area, etc.) below which a region of apparent motion will be deemed relevant. Other criteria for filtering and/or ignoring irrelevant motion may comprise maximum size limits, aspect ratio limits, consistency and/or type of the motion over time (e.g., a minimum number of consecutive images showing the motion and/or a period of time showing the motion, so as to ignore blips or apparent motion due to the camera 301 jarring or being moved.), consistency of progressive motion over time (e.g., a minimum number of consecutive images showing motion in a given direction, at least in part, so as to ignore random motion (e.g. jostling of leaves in bushes or trees, random electrical noise and variation in the images 405), minimum or maximum speeds, etc. The criteria may be selected based on expected shapes (e.g., aspect ratio of a bounding box and/or one or more base shapes), sizes, speeds, and/or motion qualities corresponding to potential objects and/or object categories 532. The criteria may be change (e.g., be scaled) as necessary with apparent distance of the region of motion from the camera 301. Motion may be determined to be detected (739—Y) if any motion is detected and/or based on a region of apparent motion satisfying one or more criteria, as above.

If an object and/or motion is not detected (739—N) in the one or more images 405, it may be determined whether a request to disarm (e.g., a request to stop or pause image-based detection) was received or determined (e.g., in step 749). If no request to disarm was received (749—N), the camera 301 may continue to acquire and/or send images 405, and one or more images 405 may be received from the camera 301, as in step 737, and processed for object and/or motion detection.

In step 741, if an object and/or motion was detected in the one or more images 405 (739—Y), one or more distances corresponding to the detected object and/or motion may be determined. For example, the distance may be determined using one or more rules for corresponding a position of the detected object and/or motion within an image 405 to a feature of a known distance in the base image 405*b*. For example, in a case that the object and/or motion is assumed to be ground-based (e.g., as a default, based on the object being categorized as a ground-based object, such as a person, a car, a package, etc.), a region associated with a lower portion of the object and/or motion (e.g., a lowest point and/or a lower edge of the region of motion 611, one or more points on a lower bound of the bounding box 612, etc.) may be assumed to be approximately in contact with a surface in the base image 405*b*, and therefore distance values of a corresponding region in the distance map 414 may be determined to be the one or more distances corresponding to the detected object and/or motion. Also, or alternatively, in the case of non-ground-based objects and/or motion (e.g., generic motion and/or objects, flying and/or air-based objects, such as drones, birds, etc.), the above ground-based assumption would not apply, but one or more other rules using other image context rules and/or assumptions may be used (e.g., tracking movement and/or position in front of or behind features corresponding to features imaged in the base image 405*b*, correlating motion and/or position to corresponding shadow objects and/or motion, etc.).

Also, or alternatively, the one or more distances corresponding to the detected object and/or motion may be determined by applying a distance estimation model (e.g., the software-based distance estimation) to a region of the one or more images 405 corresponding to the detected object and/or motion. The distance estimation model may be applied to some or all of the one or more images 405 that indicate and/or include the detected motion and/or object. The distance estimation may be applied to a limited region of the one or more images 405 that indicate and/or include the detected motion and/or object, such as a region corresponding to the detected motion and/or object (e.g., region of motion 611 and/or corresponding bounding box 612). FIG. 6C depicts an example in which the distance estimation was applied to one or more of images 405-1 . . . 405-*n* specifically in a region corresponding to a detected region of motion 611, resulting in a corresponding distance map 621 of that region. While the distance estimation may also, or alternatively be applied to all received images 405, and/or to more than regions corresponding to a detected object and/or motion, applying the distance estimation only on images with detected motion and/or objects and/or only to regions corresponding to detected motion and/or objects may reduce unnecessary computing resources and time. Using a software-based distance estimation applied to the images 405 allows for improved flexibility in determining distances corresponding to the detected object and/or motion. For example, images 405 may be captured and/or stored and processed for object and/or motion detection and/or determining distances of detected objects and/or motion as requested (e.g., by a user) and/or as required (e.g., according to monitoring rules and/or settings). For example, object and/or motion detection can be performed on a live feed and/or on a recorded video clip (e.g., stored based on one or more settings of the monitoring system 310). Software-based distance estimation for determining distances of the detected object and/or motion may be advantageous in various ways, including that software-based distance estimation (e.g., distance estimation models, as discussed previously) may be able to be applied retroactively to received and/or recorded images 405, in some cases with up-to pixel-level resolution and precision. Distance estimation models may be applied to precisely to regions of interest in images 405, such as regions corresponding detected objects and/or detected motion, and/or just in images 405 that are determined to indicated the detected object and/or motion.

Determining the one or more distances by application of a distance estimation model may avoid potential drawbacks of using rules based on image context clues and/or assumptions, such as erroneous identification of image context clues and/or erroneous application of assumptions. For example, if an air-based object, such as a drone, were detected in an image 405, either by object detection and/or as a region of motion, and the detected object were assumed to be ground-based, assuming that a low reference point and/or region is coincident with a feature in the base image 405*b* (e.g., a surface such as a floor, a ground, etc.) would likely be wrong (e.g., a flying drone would likely not be in contact with a surface imaged in the base image 405*b*). Therefore, taking a distance of the assumed coincident feature from the distance map 414 as a distance of the drone would result in an inaccurate distance determined for the drone. A distance estimation model would avoid such potential errors. On the other hand, determining the one or more distances corresponding to the detected object and/or motion using the one or more rules instead of applying a distance estimation model may save computational power and/or time and/or may allow for determining the one or more distances of objects and/or detected motion for which the applying a distance estimation model may not be possible or may be difficult (e.g., poorly lit objects and/or regions of motion, very small and/or out of focus objects and/or regions of motion, etc.). Alternatively, determining the one or more distances based on a combination of using the one or more rules and applying the distance estimation model may allow for improved accuracy in the determined one or more distances.

In step 743, a determination may be made as to what distance reaction zone(s) (if any) the detected object and/or motion belong to, based on the one or more distances determined in step 741. In general, an object and/or motion may be determined to belong to a distance reaction zone if, based on the one or more distances for the object and/or motion, the object and/or motion is determined to be within the boundaries defining the distance reaction zone. For example, FIG. 6B shows an example in which the one or more distances of the detected region of motion 611 was estimated based on a bounding box 612, and specifically, a lower bound of the bounding box 612 in step 741. Specifically, the detected region of motion 611 may have been determined to be a ground-based object (e.g., based on default settings for detected motion for the premises 102*a*, based on an object category of a detected object associated with the region of motion 611, based on a size, a shape, and/or a speed associated with the detected region of motion 611 being consistent with one or more categories of ground-based objects, etc.). The one or more rules may have comprised a rule that a lower bound of a bounding box of a detected region of motion be used as a low reference region for ground-based objects (e.g., as an estimation of a projection of a ground-based object onto the ground), and that distance values in the distance map 414 at positions corresponding to positions (e.g., pixel coordinates) of the lower bound in the image 405 be taken as the distances for the detected region of motion 611. As such, the determined distances for the detected region of motion 611 may have corresponding positions to which they apply (e.g., corresponding positions in the image 405 of the lower bound of the bounding box 612). FIG. 6B shows the lower bound of the bounding box 612 coincides with (e.g., falls within) distance reaction zone 2 (shown by highlighted region 521*b*). Based on the assumption that the detected region of motion 611 corresponds to a ground-based object, the position of the low reference region may be assumed to be coincident with features having corresponding distances in the distance map 414. Based on that assumption, the overlap of the reference region and distance reaction zone 2 (e.g., lower bound of the bounding box 612 overlapping the highlighted region 521*b* corresponding to distance reaction zone 2, in this example) may be determined to indicate that the detected motion indicated by the region of motion 611 belongs to distance reaction zone 2.

FIG. 6C shows another example in which the one or more distances of the detected region of motion 611 were determined by applying a distance estimation model to the detected region of motion 611, resulting in determined distances corresponding to positions within the detected region of motion 611 as a distance map 621 of the detected region of motion 611. Since the one or more distances indicated in the distance map 621 (e.g., approximately 8 ft) satisfy the bounds of distance reaction zone 2 (e.g., within 5-15 ft from the camera 301, as in FIG. 5I), the detected region of motion may be determined to belong to distance reaction zone 2.

In the examples illustrated in FIGS. 6B-6C, the detected region of motion 611 was determined to belong to distance reaction zone 2 as the distances of the detected region of motion are determined to be within the bounds of distance reaction zone 2. However, in some circumstances, distances of a detected object and/or motion may be determined to belong to multiple distance reaction zones (e.g., distance reaction zones may overlap and/or the detected motion and/or object may be at a location in the image 405 and correspond to one or more distances that span a border between two or more distance reaction zones). For example, in the examples of FIGS. 6B-6C, if the detected region of motion 611 were detected at 5 ft, it may be determined to belong to both distance reaction zones 1 (e.g., of FIG. 5C) and distance reaction zone 2.

In a case that a detected object and/or motion is determined to not belong to a loaded distance reaction zone, the detected object and/or motion may be determined to belong to a default distance reaction zone corresponding to default reaction rules, and/or it may be determined that the no reaction rules apply to the detected object and/or motion (745—N).

In step 745, based on what distance reaction zone(s) (if any) the detected object and/or motion were determined to belong to in step 743, it may be determined whether any reaction rules apply to the detected object and/or motion. Information indicating one or more reaction rules corresponding to the determined distance reaction zones may be retrieved. The reaction rules may indicate reactions to be performed based on detection of objects and/or motion that satisfy criteria for one or more of various characteristics, such as an object category, a size and/or shape (e.g., a size threshold for the reaction and/or an aspect ratio or other shape characteristic threshold for the reaction), a speed of the detected object and/or motion, a direction of the detected object and/or motion, a persistence length of motion of the detected object and/or motion, etc. For example, FIGS. 6B-6C comprise a sample of information 613 indicating a reaction rule for distance reaction zone 2. The information 613 indicates a reaction rule for a detected person moving in distance reaction zone 2 towards the camera 301 ("coming"), with no exclusions for certain objects of the object category. Characteristics of the detected object and/or motion may be determined and/or may have been determined in detecting the object and/or motion. For example, the detected region of motion may be determined to indicate motion of a person object (e.g., based on object recognition performed on a region corresponding to the detected region of motion in an image 405). The detected region of motion may be determined to indicate motion towards (at least in part) the camera 301, (e.g., based on an increase in size of the detected region of motion over successive images, based on a direction the person object is determined to be facing, etc.). The detected object and/or motion, and any determined characteristics thereof, may be compared with the information 613 indicating the reaction rules. Based on the comparison indicating that the detected object and/or motion satisfy the reaction rule criteria, it may be determined that the reaction rule applies to the detected object and/or motion. If the detected object and/or motion is determined to satisfy reaction rule criteria of any of the one or more reaction rules corresponding to the one or more determined distance reaction zones, then it may be determined that reaction rules apply to the object and/or motion (745—Y).

If the detected object and/or motion do not satisfy any of the reaction rule criteria associated with any of the one or more reaction rules, and/or if it was determined in step 743 that the detected object and/or motion does not belong to any distance reaction zone, it may be determined that no reaction rules apply to the detected object and/or motion (745—N).

In step 747, based on a determination that one or more reaction rules apply to the detected object and/or motion (745—Y), one or more reactions may be performed according to the rules. The reactions may comprise, for examples, outputting an audible and/or visible alarm or alert (e.g., a siren, flashing lights, vibrations, etc.) at the premises 102*a* and/or at a device associated with the user (e.g., the mobile device 125, etc.), sending command signals (e.g., to control operation of one or more devices associated with the user account and/or at the premises 102*a*, such as to cause the camera 301 to record, save, and/or overwrite or delete one or more images, to control one or more appliances at the premises 102*a*, to adjust a setting of the monitoring system 310 via the alarm panel 312 and/or the premises controller 311, etc.), sending messages (e.g., notification and/or alert messages for output at a user device, such as mobile device 125, messages to the local office 103 and/or application server 107, such as for remote user account management and/or monitoring system 310 management, messages to relevant third parties, such as emergency services and/or neighbors in the case that detected motion and/or objects are determined relevant to the third parties). The reactions may be indicated as part of the information 613 indicting the reaction rules. For example, in the examples of FIGS. 6B-6C, in response to a detected person moving towards the camera 301 in distance reaction zone 2 a mobile device should be caused to vibrate and output a banner (e.g., banner 640 in FIG. 6D), and a smart speaker (e.g., at the premises 102*a*) should output a chime sound. If multiple reaction rules are determined to apply to the detected object and/or reaction rule (e.g., based on the detected object and/or motion being determined to belong to multiple distance reaction zones), the applicable reactions may be performed based on the reaction rules and/or rules for prioritizing reactions. Rules for prioritizing reactions may indicate rules for prioritizing reaction rules of certain distance reaction zones over others. For example, a rule for prioritizing reactions may comprise a rule to perform a reaction associated with a nearer distance reaction zone before and/or over a reaction associated with a farther distance reaction zone. The distance reaction zones may have been assigned a priority (e.g., by a user during set-up and/or based on distance order, with closer distance reaction zones being higher priority than farther distance reaction zones, etc.). The distance reaction zones may be prioritized based on a degree to which the detected object and/or motion is determined to be in one distance reaction zone over another (e.g., if the detected object and/or motion is primarily in a first distance reaction zone and less so in a second distance reaction zone, the reaction of the first distance reaction zone may be prioritized over that of the second distance reaction zone).

In step 749, based the any applicable reactions being performed (747), based on a determination that no reaction rules apply to the detected object and or motion (745—N) and/or based on no object and/or motion being detected (739—N), a determination may be made as to whether a request to disarm the monitoring system 310 was received in step 749. If a request to disarm was not received (749—N), images 405 may continue to be received from the camera 301 in step 737. If a request to disarm was received (749—Y) (e.g., a request to stop or pause monitoring, a request to configure and/or modify one or more of the distance reaction zones, a request to adjust security and/or monitoring settings of the monitoring system 310, information indicating a change in the area 300 and/or of the camera field-of-view, etc.).

If the request to disarm was determined to have been received (749—Y), and/or if the monitoring system 310 was determined not to be armed and no request to arm was received (735—N), a determination may be made as to whether the one or more distance reaction zones should be modified in step 751. The one or more distance reaction zones may be determined to require modification based on a received request to configure and/or modify the one or more distance reaction zones, based on information indicating that distance reaction zones associated with another premises 102 (e.g., distance reaction zones of a similar other premises 102, on which the currently loaded distance reaction zones may be based) have been modified and/or updated, based on information indicating that the number of reactions performed based on the currently loaded one or more distance reaction zones do not satisfy one or more criteria (e.g., a reaction is determined to be performed too frequently, such as more than a threshold amount, too infrequently, such as less than a threshold amount, and/or a user of the premises 102 has provided input to increase or decrease a frequency or quantity at which the reactions should be performed), based on information indicating a long-term change in the area 300, etc. The determination that the one or more distance reaction zones should be modified may be based on settings to automatically update, modify and/or reconfigure the distance reaction zones and/or distance map on a schedule (e.g., periodically or in response to a trigger, such as after a set quantity of detection events and/or reactions performed, based on settings of the monitoring system 310 and/or of the user account). If it is determined that the one or more distance reactions are not to be modified (751—N), the method may return to step 735 to determine whether a request to arm the monitoring system 310 was received.

In step 753, based on a determination that the one or more distance reaction zones should be modified (751—Y), a determination may be made as to whether a long term change was detected (e.g., movement of the camera 301, a change in one or more camera image landmark objects 462 in an image 405 from the camera 301, etc.). If a long term change was detected (753—Y), a new base image may be received and a new distance map may be generated (arrow C). Any currently applied distance reaction zones may then be adapted for the new distance map and/or one or more new suggested reaction zones may be determined. If no long term change was detected (753—N), the distance reaction zones may be modified as described with respect to steps 721-731, for example.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

receiving, by a computing device of a monitoring system, a first image of an area monitored by an imaging device, generating, based on the first image, a distance map mapping pixels in the first image to distances between the image device and portions of the area;

receiving a first user input indicating a distance;

causing output of a version of the first image modified, based on the first user input and the distance map, to indicate a portion of the first image that corresponds to one or more features in the first image that are within the distance from the imaging device;

receiving a second user input indicating a rule for reacting to objects detected within the distance from the imaging device; and triggering output of an alert based on the rule and based on detecting, in a second image captured by the imaging device, an object within the distance from the imaging device.

2. The method of claim 1, further comprising:

after the causing output of the modified version of the first image:

receiving a third user input indicating a second distance;

causing output of a second version of the first image modified, based on the third user input and the distance map, to indicate a second portion of the first image that corresponds to one or more second features in the first image that are within the second distance from the imaging device.

3. The method of claim 1, further comprising:

receiving information indicating one or more geographic locations of one or more landmark objects in the area; and matching the one or more features in the first image with the one or more landmark objects.

4. The method of claim 1, further comprising generating a mask based on the first user input and the distance map, wherein the portion of the first image corresponds to the mask.

5. The method of claim 1, wherein the first user input comprises a user-selected range of distances; and wherein the second user input indicates a rule for reacting to objects detected within the user-selected range of distances.

6. The method of claim 1, further comprising receiving a plurality of different rules, wherein the plurality of different rules comprises:

a first rule for reacting to objects detected within a first distance from the imaging device; and a second rule for reacting to the objects detected within a different distance from the imaging device.

7. The method of claim 1, further comprising:

based on similarities between the area and a second area separate from the area, causing output of one or more rules associated with the second area.

8. The method of claim 1, further comprising receiving a plurality of different rules, wherein the plurality of different rules comprises:

a first rule for triggering a first type of alert based on a determination that the object is moving along a first direction; and a second rule for triggering a second type of alert based on a determination that the object is moving along a second direction different from the first direction.

9. The method of claim 1, wherein the first imaging device is a monocular camera, and wherein the generating the distance map comprises applying a monocular image estimation model to the first image.

10. A method comprising:

receiving, by a computing device of a monitoring system, a request to configure monitoring, by a first imaging device, of a first area of a first premises;

based on a second premises, separate from the first premises and comprising a second area monitored by a second imaging device, sharing an attribute with the first premises, retrieving one or more rules, associated with the second premises, for reacting to objects detected within one or more distance ranges from the second imaging device;

receiving a first image of the first area captured by the first imaging device and a distance map mapping pixels in the first image to distances between the first imaging device and portions of the first area;

causing output of:

a version of the first image modified, based on the distance map and the one or more distance ranges, to indicate a portion of the first image that corresponds to one or more features in the first image that are within a distance range from the first imaging device; and a rule, of the one or more rules, corresponding to the distance range;

receiving a second image of the first area captured by the first imaging device; and triggering output of an alert based on the rule and based on detecting, in the second image, an object within the distance range from the first imaging device.

11. The method of claim 10, further comprising:

receiving a third image, from the first imaging device, indicating an object;

determining, based on the distance map and the third image, a second distance range corresponding to a portion, of the third image, in which the object appears;

selecting, from the one or more rules, a rule that corresponds to the second distance range; and causing, based on the selected rule, a reaction to the object.

12. The method of claim 10, wherein the attribute comprise one or more of a property type of a premises, a type of a building on a premises, household data associated with a premises, neighborhood information, a plot size of a premises, a physical characteristic of a building on a premises, a position of a building on a premises, or a structural feature on a premises.

13. The method of claim 10, further comprising:

determining, based on the distance map and the one or more distance ranges, a plurality of suggested image portions in the first image by comparing one or more features in the first image to corresponding features associated with the second area of the second premises.

14. The method of claim 10, further comprising selecting each rule, of the one or more rules, based on a quantity of premises comprising the second premises having the rule.

15. The method of claim 10, further comprising:

receiving a request to modify a second distance range of the one or more distance ranges; and outputting, based on the request to modify, the first image and, in the first image, an editable indication of an image portion corresponding to the second distance range.

16. The method of claim 10, wherein the triggering the output of the alert is further based on receiving, after displaying the version of the first image, an indication to apply the rule to the distance range.

17. The method of claim 10, further comprising adapting, a comparison between a first feature in the first image to a second feature in a second image of the second area captured by the second imaging device, the one or more distance ranges to determine the distance range.

18. An apparatus comprising:

one or more processors; and a memory storing instructions that, when executed by the one or more processors, configure the apparatus to:

receive a request to configure monitoring, by a first imaging device, of a first area of a first premises;

based on a second premises, separate from the first premises and comprising a second area monitored by a second imaging device, sharing an attribute with the first premises, retrieve one or more rules, associated with the second premises, for reacting to objects detected within one or more distance ranges from the second imaging device;

receive a first image of the first area captured by the first imaging device and a distance map mapping pixels in the first image to distances between the first imaging device and portions of the first area;

cause output of:

a version of the first image modified, based on the distance map and the one or more distance ranges, to indicate a portion of the first image that corresponds to one or more features in the first image that are within a distance range from the first imaging device; and a rule, of the one or more rules, corresponding to the distance range;

receiving a second image of the first area captured by the first imaging device; and trigger output of an alert based on the rule and based on detecting, in the second image, an object within the distance range from the first imaging device.

19. The apparatus of claim 18, wherein the instructions, when executed by the one or more processors, further configure the apparatus to:

receive a third image, from the first imaging device, indicating an object;

determine, based on the distance map and the third image, a second distance range corresponding to a portion, of the third image, in which the object appears;

select, from the one or more rules, a rule that corresponds to the second distance range; and cause, based on the selected rule, a reaction to the object.

20. The apparatus of claim 18, wherein the attribute comprises one or more of a property type of a premises, a type of a building on a premises, household data associated with a premises, neighborhood information, a plot size of a premises, a physical characteristic of a building on a premises, a position of a building on a premises, or a structural feature on a premises.

* * * * *